US012596621B2

(12) United States Patent
Liu et al.

(10) Patent No.: US 12,596,621 B2
(45) Date of Patent: Apr. 7, 2026

(54) FAULT-RESILIENT SOFTWARE-DEFINED PERSISTENT MEMORY SYSTEM

(71) Applicant: Dell Products L.P., Round Rock, TX (US)

(72) Inventors: Wei Liu, Austin, TX (US); Ching-Lung Chao, Austin, TX (US); Shih-Hao Wang, Austin, TX (US); William Tuccio, Shorewood, MN (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/894,374

(22) Filed: Sep. 24, 2024

(65) Prior Publication Data

US 2026/0086905 A1 Mar. 26, 2026

(51) Int. Cl.
*G06F 11/00* (2006.01)
*G06F 11/20* (2006.01)
(52) U.S. Cl.
CPC ...... *G06F 11/2084* (2013.01); *G06F 11/2082* (2013.01)
(58) Field of Classification Search
CPC .......................... G06F 11/2084; G06F 11/2082
USPC ....................................... 714/1–57
See application file for complete search history.

(56) References Cited

U.S. PATENT DOCUMENTS

| | | | |
|---|---|---|---|
| 11,983,111 B2 * | 5/2024 | Mysore Shantamurthy | ................ G06F 11/2046 |
| 2015/0268874 A1 * | 9/2015 | Bollandoor | ........... G06F 9/4406 711/104 |
| 2020/0151104 A1 * | 5/2020 | Yang | ................... G06F 13/4282 |
| 2021/0349780 A1 * | 11/2021 | Ki | ........................ G06F 11/1092 |
| 2021/0349781 A1 * | 11/2021 | Ki | ........................ G06F 3/0659 |
| 2021/0349782 A1 * | 11/2021 | Ki | ........................ G06F 11/165 |
| 2022/0012147 A1 * | 1/2022 | Ki | ........................ G06F 3/0689 |

* cited by examiner

*Primary Examiner* — Sarai E Butler
(74) *Attorney, Agent, or Firm* — Joseph Mencher

(57) ABSTRACT

A fault-resilient software-defined persistent memory system includes a chassis, a volatile memory system that is housed in the chassis, and a Basic Input/Output System (BIOS) that is housed in the chassis and coupled to the volatile memory system. The BIOS defines a Fault Resilient Mode (FRM) primary data storage zone and a FRM mirrored data storage zone in the volatile memory system. The BIOS also defines a Software-Defined Persistent Memory (SDPM) zone in the volatile memory system that at least partially overlaps with the FRM primary data storage zone. A memory controller subsystem in the volatile memory system receives a write request to write data to the SDPM zone and, in response to receiving the write request, writes the data to the SDPM zone. The memory controller subsystem then writes the data that was written to the SDPM zone to the FRM mirrored data storage zone.

20 Claims, 27 Drawing Sheets

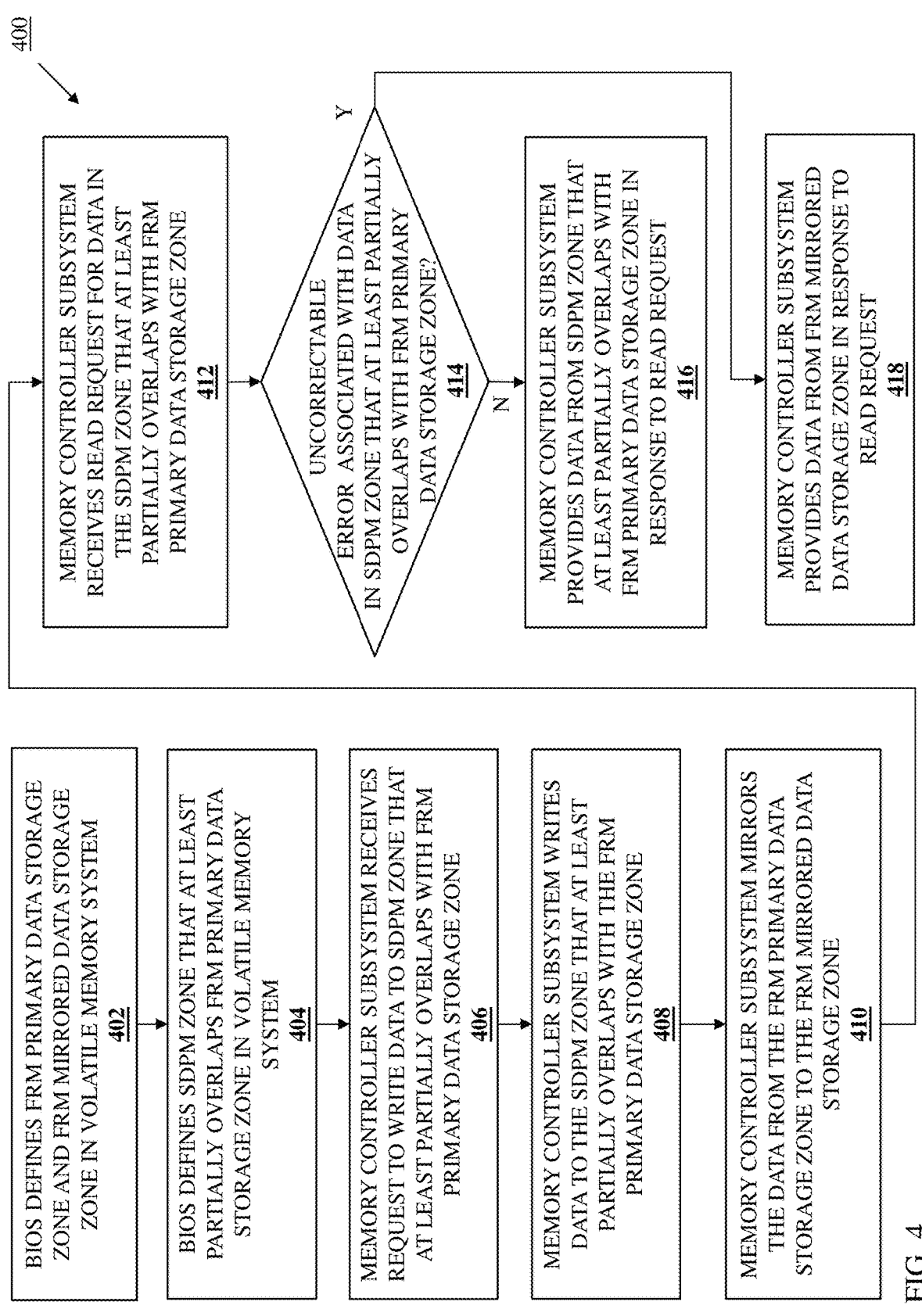

400

BIOS DEFINES FRM PRIMARY DATA STORAGE ZONE AND FRM MIRRORED DATA STORAGE ZONE IN VOLATILE MEMORY SYSTEM
402

BIOS DEFINES SDPM ZONE THAT AT LEAST PARTIALLY OVERLAPS FRM PRIMARY DATA STORAGE ZONE IN VOLATILE MEMORY SYSTEM
404

MEMORY CONTROLLER SUBSYSTEM RECEIVES REQUEST TO WRITE DATA TO SDPM ZONE THAT AT LEAST PARTIALLY OVERLAPS WITH FRM PRIMARY DATA STORAGE ZONE
406

MEMORY CONTROLLER SUBSYSTEM WRITES DATA TO THE SDPM ZONE THAT AT LEAST PARTIALLY OVERLAPS WITH THE FRM PRIMARY DATA STORAGE ZONE
408

MEMORY CONTROLLER SUBSYSTEM MIRRORS THE DATA FROM THE FRM PRIMARY DATA STORAGE ZONE TO THE FRM MIRRORED DATA STORAGE ZONE
410

MEMORY CONTROLLER SUBSYSTEM RECEIVES READ REQUEST FOR DATA IN THE SDPM ZONE THAT AT LEAST PARTIALLY OVERLAPS WITH FRM PRIMARY DATA STORAGE ZONE
412

UNCORRECTABLE ERROR ASSOCIATED WITH DATA IN SDPM ZONE THAT AT LEAST PARTIALLY OVERLAPS WITH FRM PRIMARY DATA STORAGE ZONE?
414

Y

N

MEMORY CONTROLLER SUBSYSTEM PROVIDES DATA FROM SDPM ZONE THAT AT LEAST PARTIALLY OVERLAPS WITH FRM PRIMARY DATA STORAGE ZONE IN RESPONSE TO READ REQUEST
416

MEMORY CONTROLLER SUBSYSTEM PROVIDES DATA FROM FRM MIRRORED DATA STORAGE ZONE IN RESPONSE TO READ REQUEST
418

Figure 5A:
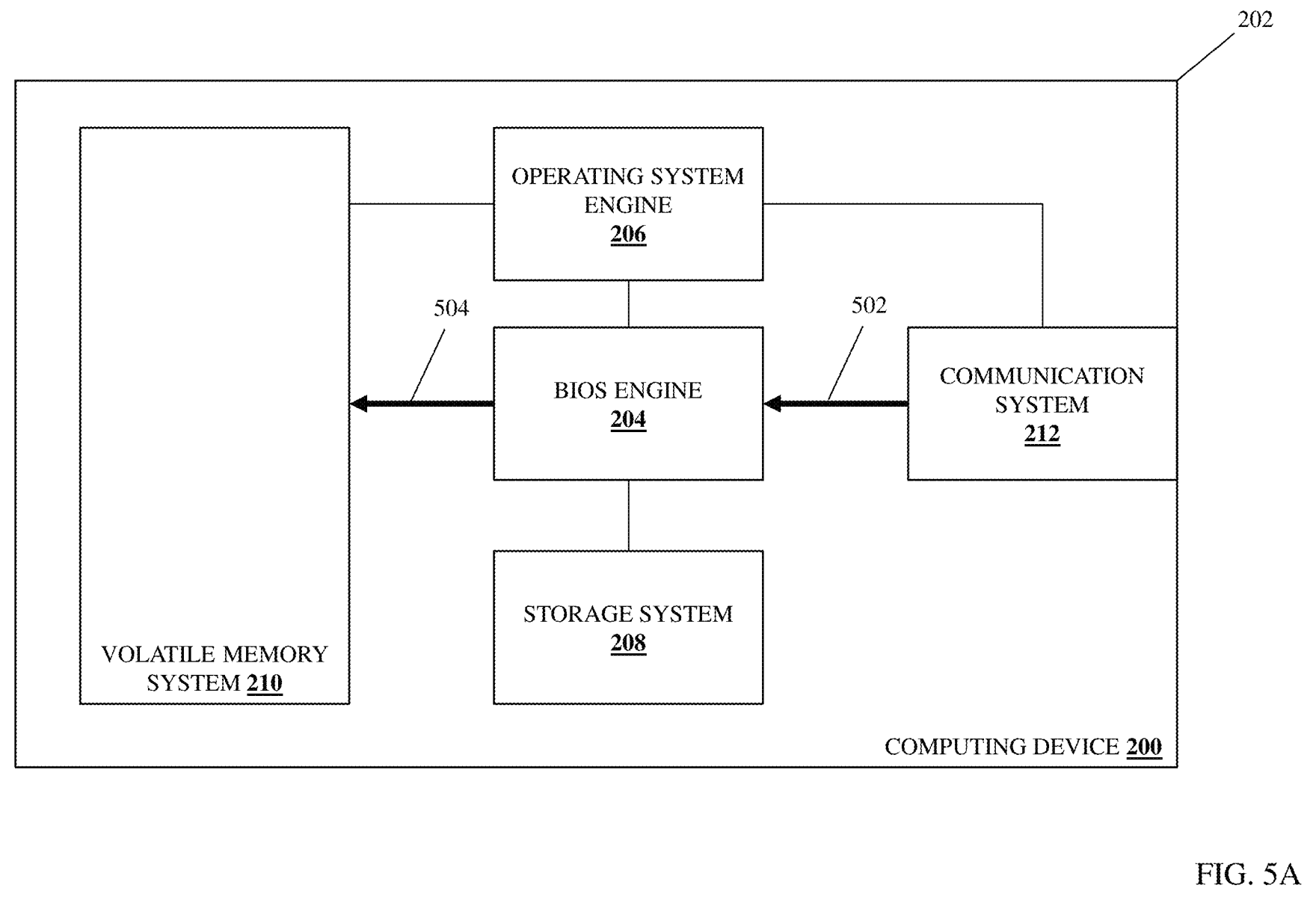

COMMUNICATION SYSTEM 212

502

OPERATING SYSTEM ENGINE 206

BIOS ENGINE 204

STORAGE SYSTEM 208

504

VOLATILE MEMORY SYSTEM 210

COMPUTING DEVICE 200

COMMUNICATION SYSTEM 212

602

OPERATING SYSTEM ENGINE 206

BIOS ENGINE 204

STORAGE SYSTEM 208

604

VOLATILE MEMORY SYSTEM 210

COMPUTING DEVICE 200

COMMUNICATION SYSTEM 212

OPERATING SYSTEM ENGINE 206

BIOS ENGINE 204

STORAGE SYSTEM 208 vNVDIMM 700

VOLATILE MEMORY SYSTEM 210

COMPUTING DEVICE 200

202

COMMUNICATION SYSTEM 212

OPERATING SYSTEM ENGINE 206

BIOS ENGINE 204

STORAGE SYSTEM 208

800 vNVDIMM 700

VOLATILE MEMORY SYSTEM 210

COMPUTING DEVICE 200

202

302

308

902

800

MEMORY
CONTROLLER
SUBSYSTEM
304

FRM MIRRORED DATA STORAGE
ZONE 506b

900

SDPM ZONE 606a

FRM PRIMARY DATA STORAGE
ZONE 506a

VOLATILE MEMORY SYSTEM 300

N

308c

N - X

308b (N-X) - Y

Z

308a

0

202

COMMUNICATION SYSTEM 208

OPERATING SYSTEM ENGINE 204

BIOS ENGINE 204

STORAGE SYSTEM 204

1004 vNVDIMM 700

VOLATILE MEMORY SYSTEM 204

COMPUTING DEVICE 200

MEMORY CONTROLLER SUBSYSTEM 304

1106

FRM MIRRORED DATA STORAGE ZONE 506b

SDPM ZONE 606a

FRM PRIMARY DATA STORAGE ZONE 506a

VOLATILE MEMORY SYSTEM 300

302

308

N

N - X (N-X) - Y

308c

308b

Z

0

308a

FAULT-RESILIENT SOFTWARE-DEFINED PERSISTENT MEMORY SYSTEM

BACKGROUND

The present disclosure relates generally to information handling systems, and more particularly to providing a software-defined persistent memory system in an information handling system that is fault resilient.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes store data using hardware-based persistent memory systems. However, such hardware-based persistent memory systems are relatively expensive, and an alternative, less expensive option for persistent data storage is Software Defined Persistent Memory (SDPM) systems. SDPM systems allow users to define SDPM memory region(s) in a volatile memory subsystem (e.g., a Double Data Rate (DDR) memory subsystem) that are presented to an operating system as persistent memory region(s) (e.g., the persistent memory region(s) may be presented to the operating system as a virtual Non-Volatile Dual In-line Memory Module-Non-volatile (NVDIMM-N) device).

During a power loss, system reset or shutdown event, a Basic Input/Output System (BIOS) SDPM System Management Interrupt (SMI) handler will save the data stored in the SDPM memory region(s) to a persistent storage subsystem (e.g., vault Non-Volatile Memory Express (NVMe) drives provided in a Vault Optimized Storage System (VOSS) available from DELL® Inc. of Round Rock, Texas, United States) while the volatile memory subsystem receives battery power, and will then restore the saved data from the persistent storage subsystem back to the SDPM memory region(s) following a subsequent initialization.

However, the use of conventional SDPM systems presents issues, particularly in the event of an uncorrectable error in the SDPM memory region(s). For example, the SDPM memory region(s) may be used to store kernel code, and an uncorrectable error in the SDPM memory region(s) will prevent the execution of the kernel code and cause a system crash. In another example, the SDPM memory region(s) may be used to store "in-flight" application data for subsequent writing to persistent storage (along with corresponding metadata for "journaling" in the SDPM memory region(s)), and an uncorrectable error in the SDPM memory region(s) will result in the crash of an application for which that data was written, along with the loss of that data.

Accordingly, it would be desirable to provide a SDPM system that addresses the issues discussed above.

SUMMARY

According to one embodiment, a volatile memory system includes: at least one memory device that defines a memory address range; and a memory controller subsystem that is coupled to the at least one memory device and that is configured to: receive a write request to write data to a Software-Defined Persistent Memory (SDPM) zone that is defined in the memory address range such that the SDPM zone at least partially overlaps with a Fault Resilient Memory (FRM) primary data storage zone that is defined in the memory address range; write, in response to the write request, the data to the SDPM zone that at least partially overlaps with the FRM primary data storage zone; and write, to an FRM mirrored data storage zone that is defined in the memory address range, the data that was written to the SDPM zone that at least partially overlaps with the FRM primary data storage zone.

BRIEF DESCRIPTION OF THE DRAWINGS

FIG. 4 is a flow chart illustrating an embodiment of a method for providing a fault-resilient software defined persistent memory in a computing device.

FIG. 5A is a schematic view illustrating an embodiment of the computing device of FIG. 2 operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
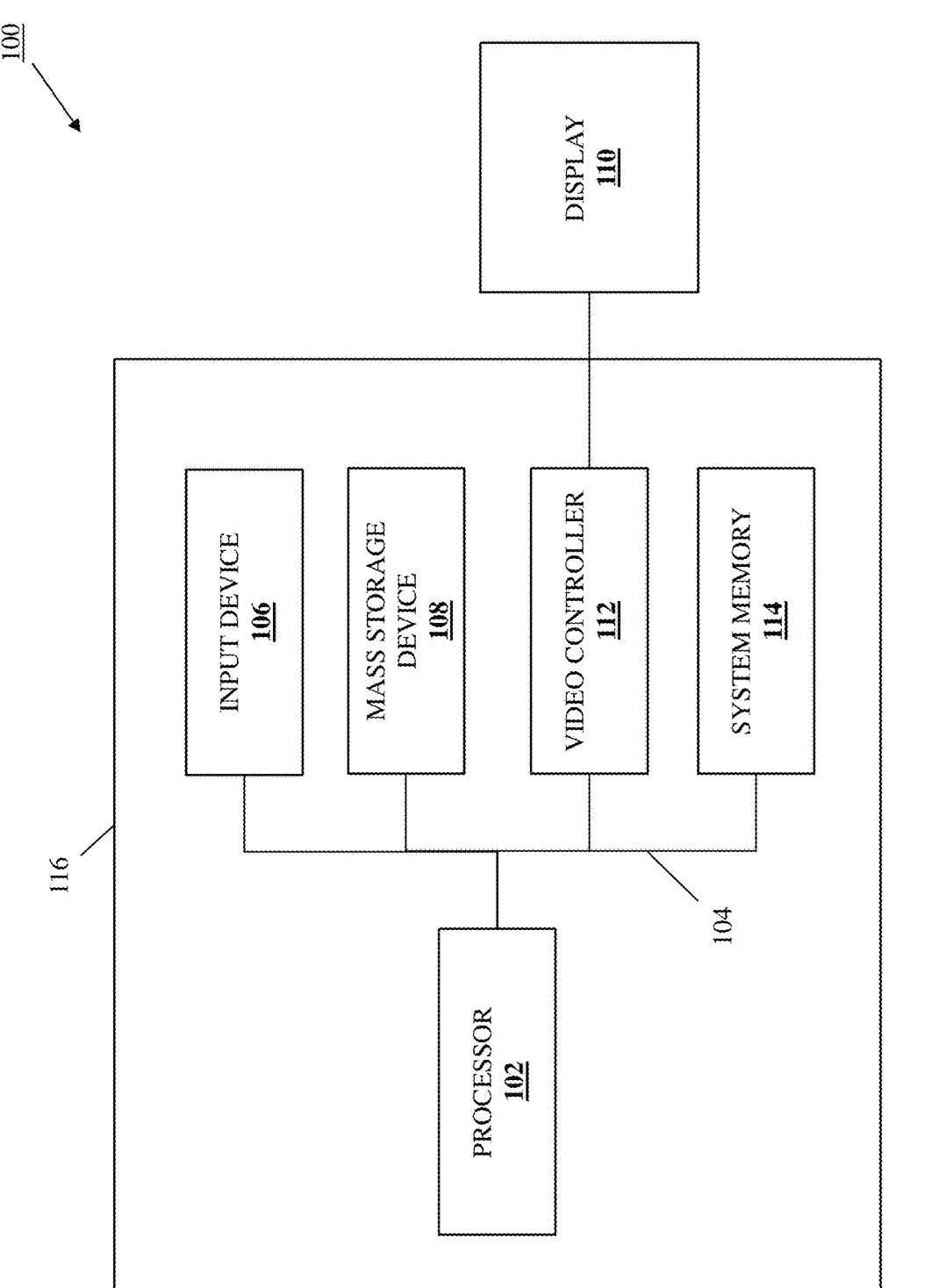
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
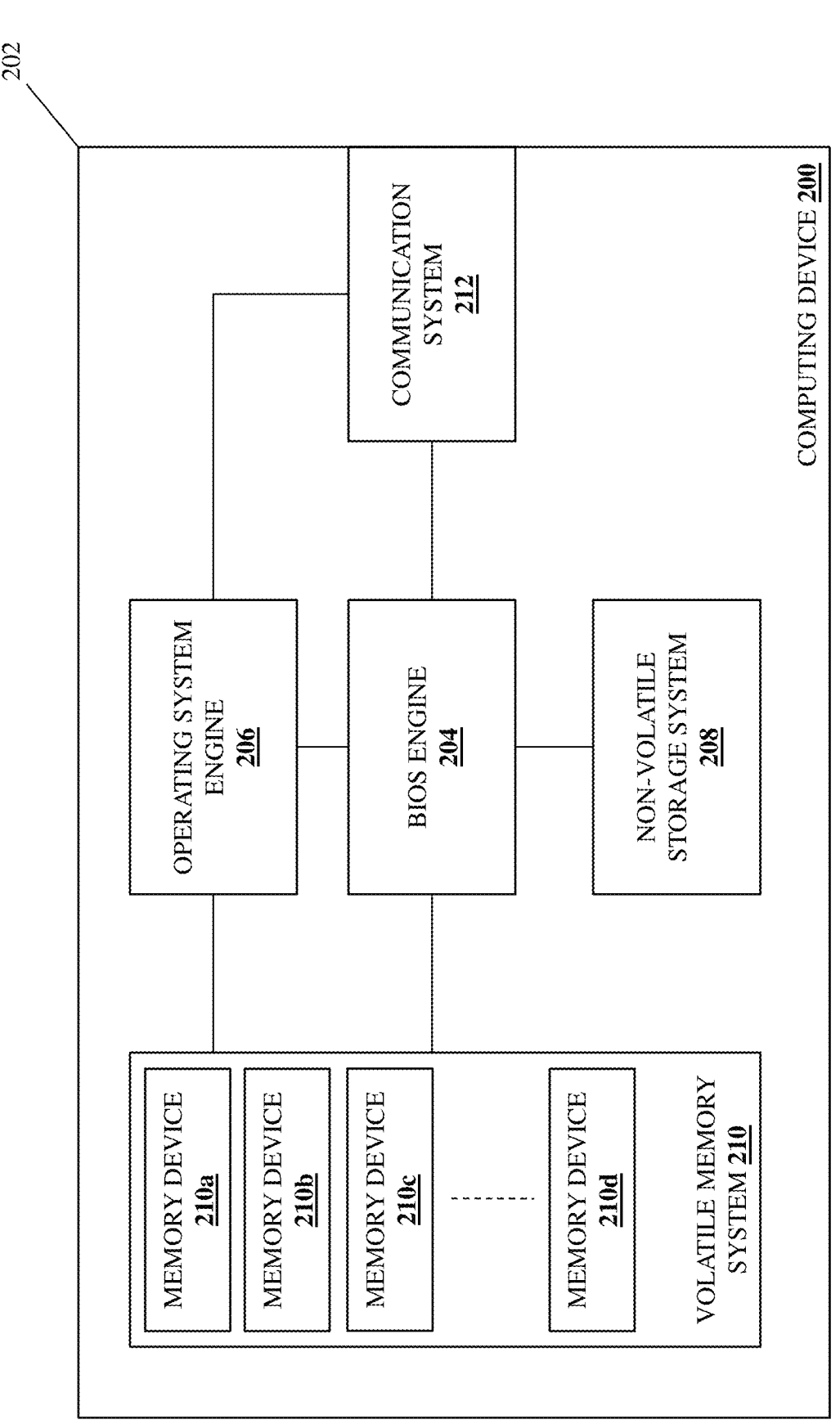
FIG. 2 is a schematic view illustrating an embodiment of a computing device that includes the fault-resilient software-defined persistent memory system of the present disclosure.

Referring now to FIG. 2, an embodiment of a computing device 200 is illustrated that may provide the fault-resilient software defined persistent memory system of the present disclosure. The computing device 200 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below. In the illustrated embodiment, the computing device 200 includes a chassis 202 that houses the components of the computing device 200, only some of which are illustrated and discussed below.

For example, the chassis 202 may house a Basic Input/Output System (BIOS) processing system (not illustrated, but which may include BIOS processing firmware) and a BIOS memory system (not illustrated, but which may include BIOS firmware memory) that is coupled to the BIOS processing system and that includes instructions that, when executed by the BIOS processing system, cause the BIOS processing system to provide a Basic Input/Output System (BIOS) engine 204 that is configured to provide a BIOS and/or perform the functionality of the BIOS engines and/or computing devices discussed below. For example, the BIOS engine 204 may be configured to perform hardware initialization, boot process management, system configuration, and/or other BIOS functions that would be apparent to one of skill in the art in possession of the present disclosure. However, while illustrated and described below as a BIOS engine, one of skill in the art in possession of the present disclosure will appreciate how the BIOS engine 204 may be provided by a Unified Extensible Firmware Interface (UEFI) engine and/or other initialization engine while remaining within the scope of the present disclosure as well.

The chassis 202 may also house a primary processing system (not illustrated, but which may include the processor 102 discussed above with reference to FIG. 1 such as a Central Processing Unit (CPU)) and primary memory system (not illustrated, but which may include the memory 114 discussed above with reference to FIG. 1 such as, for example, Dynamic Random Access Memory (DRAM)) that is coupled to the primary processing system that includes instructions that, when executed by the processing system, cause the primary processing system to provide an operating system engine 206 that is configured to provide an operating system and/or perform the functionality of the operating system engines and/or computing devices discussed below. For example, in the illustrated embodiment, the operating system engine 206 may be configured to provide system software that manages computer hardware, software resources, common services for computer programs, and/or provide other operating system functionality that would be apparent to one of skill in the art in possession of the present disclosure. As illustrated, the operating system engine 206 may be coupled to the BIOS engine 204 (e.g., via a coupling between the primary processing system and the BIOS processing system).

The chassis 202 may also house a non-volatile storage system 208 that is coupled to the BIOS engine 204 (e.g., via a coupling between the non-volatile storage system 208 and the BIOS processing system). In an embodiment, the non-volatile storage system 208 may be provided by a Hard Disk Drive (HDD), a Solid-State Drive (SSD) such as a Non-Volatile Memory express (NVMe) drive (e.g., a VOSS NVMe drive configured for use with Software Defined Persistent Memory (SDPM) operations), and/or other non-volatile storage systems known in the art that are configured to persistently store data when not receiving power. However, while specific examples of non-volatile storage systems have been described, one of skill in the art in possession of the present disclosure will appreciate how other non-volatile storage systems will fall within the scope of the present disclosure as well.

The chassis 202 may also house a volatile memory system 210 that is coupled to the BIOS engine 204 (e.g., via a coupling between the volatile memory system 210 and the BIOS processing system) and the operating system engine 206 (e.g., via a coupling between the volatile memory system 210 and the primary processing system) and that includes a plurality of memory devices 210a, 210b, 210c, and up to 210d. For example, the memory devices 210a-210d may be provided by Random Access Memory (RAM) devices, Dynamic Random Access Memory (DRAM) devices, Double Data Rate (DDR) DRAM devices, and/or other types of memory devices that are not configured to retain data when not receiving power. However, while specific examples of volatile memory systems have been described, one of skill in the art in possession of the present disclosure will appreciate how other volatile memory systems will fall within the scope of the present disclosure as well.

The chassis 202 may also house a communication system 212 that is coupled to the BIOS engine 204 (e.g., via a coupling between the communication system 212 and the BIOS processing system) and the operating system engine 206 (e.g., via a coupling between the communication system 212 and the primary processing system) and that may be provided by a Network Interface Controller (NIC), wireless communication systems (e.g., BLUETOOTH®, Near Field Communication (NFC) components, WiFi components, etc.), input devices (e.g., a keyboard, mouse, etc.), and/or any other communication components that would be apparent to one of skill in the art in possession of the present disclosure. However, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the fault-resilient software-defined persistent memory functionality described below, while remaining within the scope of the present disclosure as well.

Figure 3:
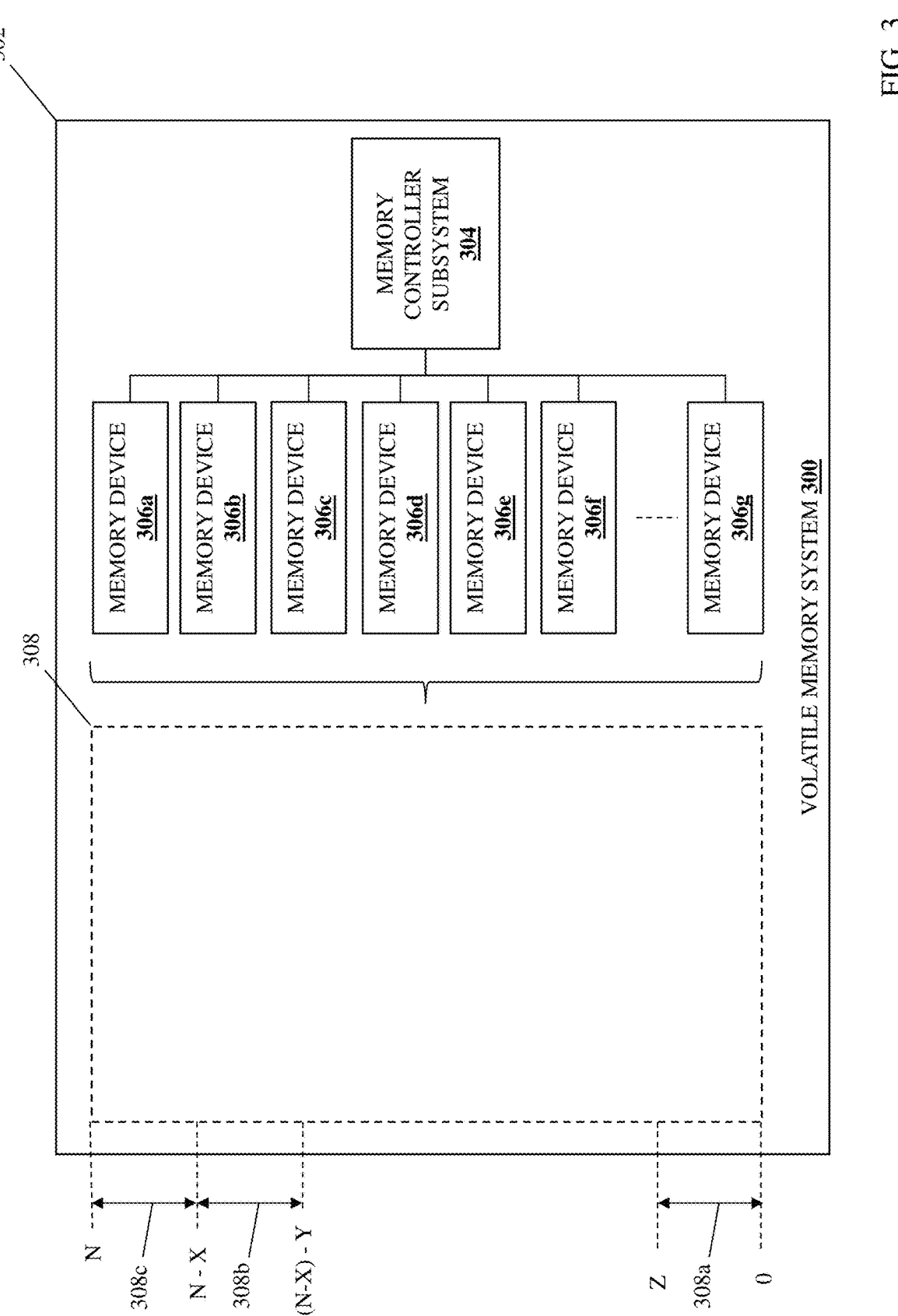
FIG. 3 is a schematic view illustrating an embodiment of a volatile memory system that may be included in the computing device of FIG. 2 and that may provide the fault-resilient software-defined persistent memory system of the present disclosure.

Referring now to FIG. 3, an embodiment of a volatile memory system 300 is illustrated that may provide the volatile memory system 210 discussed above with reference to FIG. 2. As such, the volatile memory system 300 may be provided by a RAM system, a DRAM system, a DDR DRAM system, and/or other types of memory systems that are not configured to persistently store data when not receiving power as discussed above. In the illustrated embodiment, the volatile memory system 300 includes a chassis 302 (e.g., a circuit board, card, or other volatile memory system chassis that would be apparent to one of skill in the art in possession of the present disclosure) that supports the components of the volatile memory system 300, only some of which are illustrated and discussed below.

For example, the chassis 302 may support a memory controller subsystem 304 that one of skill in the art in possession of the present disclosure will appreciate may couple the volatile memory system 300 to the BIOS engine 204 (e.g., via the BIOS processing system) and operating system engine 206 (e.g., the primary processing system) discussed above with reference to FIG. 2. The chassis 302 also supports a plurality of memory devices 306a, 306b, 306c, 306d, 306c, 306f and up to 306g that are coupled to the memory controller subsystem 304 and that may provide the memory devices 210a-210d discussed above with reference to FIG. 2. As such, the memory devices 306a-306g may be provided by RAM devices, DRAM devices, DDR DRAM devices, and/or other types of memory devices that are not configured to retain data when not receiving power as discussed above.

As illustrated, the memory subsystems in each of the memory devices 306a-306g may be configured to provide a memory address space 308 having a total memory address range from a "0" address to an "N" address ("total memory address range 0-N"), and one of skill in the art in possession of the present disclosure will appreciate that the memory addresses in the total memory address range 0-N may include virtual memory addresses, physical memory addresses, and/or combinations thereof. Furthermore, the total memory address range 0-N includes an operating-system-addressable memory address sub-range from the "0" address to an "(N-X)" address ("operating-system-addressable memory address sub-range 0-(N-X)"), and a non-operating-system-addressable memory address sub-range from the "(N-X)" address to the "N" address ("non-operating-system-addressable memory address sub-range (N-X)-N"). In the examples provided below, the operating-system-addressable memory address sub-range 0-(N-X) is described as including a "beginning"/"bottom" memory address portion 308a starting with the "0" address and ending with a "Z" address, an "ending"/"top" memory address portion 308*b* starting with an "(N-X)-Y" address and ending with the "N-X" address. Furthermore, a "mirroring" memory address portion 308*c* is described as being provided in the non-operating-system-addressable memory address sub-range (N-X)-N.

However, while a specific memory address space 308 has been illustrated and described, one of skill in the art in possession of the present disclosure will appreciate how memory address space used in the fault-resilient software-defined persistent memory system may be configured in a variety of manners that will provide for the functionality described below. Furthermore, while a specific volatile memory system 300 has been illustrated and described, one of skill in the art in possession of the present disclosure will recognize that volatile memory systems may include a variety of components and/or component configurations for providing conventional volatile memory system functionality, as well as the fault-resilient software-defined persistent memory functionality described below, while remaining within the scope of the present disclosure as well.

Referring now to FIG. 4, an embodiment of a method 400 for providing a fault-resilient software-defined persistent memory system in a computing device is illustrated. As discussed below, the systems and methods of the present disclosure configure a volatile memory system with Fault Resilient Mode (FRM) primary and mirrored data storage zones, and then configure that volatile memory system with a Software-Defined Persistent Memory (SDPM) zone that at least partially overlaps the FRM primary data storage zone. For example, the fault-resilient software-defined persistent memory system of the present disclosure may include a chassis, a volatile memory system that is housed in the chassis, and a Basic Input/Output System (BIOS) that is housed in the chassis and coupled to the volatile memory system. The BIOS defines a FRM primary data storage zone and a FRM mirrored data storage zone in the volatile memory system. The BIOS also defines a SDPM zone in the volatile memory system that at least partially overlaps with the FRM primary data storage zone. A memory controller subsystem in the volatile memory system receives a write request to write data to the SDPM zone and, in response to receiving the write request, writes the data to the SDPM zone. the memory controller subsystem then writes the data that was written to the SDPM zone to the FRM mirrored data storage zone. As such, if uncorrectable errors occur in the data stored in the SDPM zone that at least partially overlaps with the FRM primary data storage zone, the copy of that data in the FRM mirrored data storage zone may be used.

The method 400 begins at block 402 where a BIOS defines a FRM primary data storage zone and FRM mirrored data storage zone. With reference to FIG. 5A, in an embodiment of block 402, the BIOS engine 204 in the computing device 200 may perform FRM activation instruction receiving operations 502 that may include receiving an instruction to activate FRM in the computing device 200 via its communication system 212 (e.g., from a network administrator or other user of the computing device 200). As discussed below, the fault-resilient software-defined persistent memory system of the present disclosure may be configured to allow a network administrator or other user to activate both FRM and SDPM in the computing device 200 at the same time, and thus the FRM activation operations 502 may be performed by the BIOS engine 204 concurrently with the SDPM activation operations discussed in further detail below.

Figure 5B:
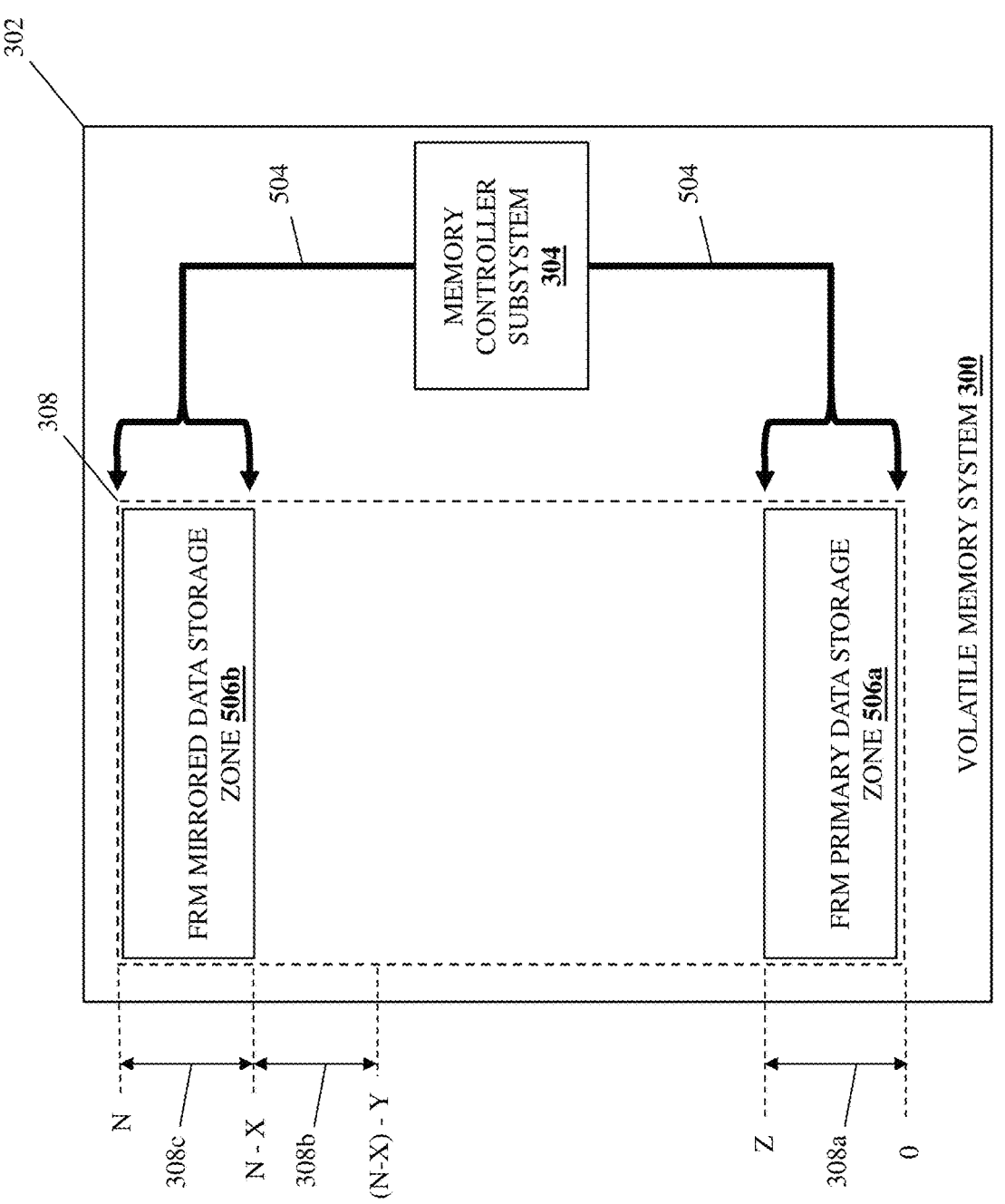
FIG. 5B is a schematic view illustrating an embodiment of the volatile memory system of FIG. 3 operating during the method of FIG. 4.

With reference to FIGS. 5A and 5B, in an embodiment of block 402 and in response to receiving the instruction to activate FRM in the computing device 200, the BIOS engine 204 in the computing device 200 may perform FRM activation operations 504 that may include using the memory controller subsystem 304 in the volatile memory system 210/300 to define a FRM primary data storage zone 506*a* and a FRM mirrored data storage zone 506*b* in the memory address space 308 of the volatile memory system 210/300. For example, the FRM activation operations 504 may include the BIOS engine 204 configuring its Memory Reference Code (MRC) to define the FRM primary data storage zone 506*a* and the FRM mirrored data storage zone 506*b* in the memory address space 308 relatively early in a boot process or other initialization process for the computing device 200.

As will be appreciated by one of skill in the art in possession of the present disclosure, in many embodiments the FRM primary data storage zone 506*a* and the FRM mirrored data storage zone 506*b* may be provided using different memory devices (e.g., the FRM primary data storage zone 506*a* may be provided using the memory device 210*a*, and the FRM mirrored data storage zone 506*b* may be provided using the memory device 210*b*) to protect data from a memory device failure, may be interleaved on different memory devices, and/or may be provided in the memory address space 308 in any manner that would be apparent to one of skill in the art in possession of the present disclosure. However, embodiments in which the FRM primary data storage zone 506*a* and the FRM mirrored data storage zone 506*b* are provided using the same memory device will fall within the scope of the present disclosure as well.

One of skill in the art in possession of the present disclosure will appreciate how the FRM of the present disclosure may be a user-activated memory system operating mode that, when enabled, configures a percentage of the memory system as a "fault resilient" zone for use by FRM-aware operating systems (e.g., hypervisors) to store data, with that fault resilient zone using processing system functionality (e.g., INTEL® address range mirroring functionality available in processing systems provided by INTEL® corporation of Santa Clara, California, United States) to provide for the mirroring of data (e.g., data stored in the FRM primary data storage zone 506*a* is mirrored in the FRM mirrored data storage zone 506*b* as discussed in further detail below). To provide a specific example, the user activation of FRM in the computing device 200 may include the selection by the user of a percentage or amount of memory that will operate in FRM (e.g., in a 4 TB memory system, a selection of 25% memory to operate in FRM will result in the FRM primary data storage zone 506*a* being provided by 1 TB in the volatile memory system 210/300, and the FRM mirrored data storage zone 506*b* being provided by 1 TB in the volatile memory system 210/300).

In the illustrated embodiment, the FRM primary data storage zone 506*a* has been defined in the "beginning"/ "bottom" memory address portion 308*a* of the operating-system-addressable memory address sub-range 0-(N-X) in the memory address space 308 (i.e., the portion 0-Z in the operating-system-addressable memory address sub-range 0-(N-X) of the total memory address range 0-N), while the FRM mirrored data storage zone 506*b* has been defined in the "mirroring" memory address portion 308*c* provided by the non-operating-system-addressable memory address sub-range (N-X)-N in the total memory address range 0-N). However, as will be appreciated by one of skill in the art in possession of the present disclosure and as described in further detail below, the FRM primary data storage zone may be defined in other portions of operating-system-addressable memory address sub-range 0-(N-X) in the memory address space 308 while remaining within the scope of the present disclosure as well.

Figure 6A:
FIG. 6A is a schematic view illustrating an embodiment of the computing device of FIG. 2 operating during the method of FIG. 4.

The method 400 then proceeds to block 404 where the BIOS defines an SDPM zone that at least partially overlaps the FRM primary data storage zone in the volatile memory system. With reference FIG. 6A, in an embodiment of block 404, the BIOS engine 204 may perform SDPM activation instruction receiving operations 602 that may include receiving an instruction to activate SDPM in the computing device 200 via its communication system 212 (e.g., from a network administrator or other user of the computing device 200). As discussed above, the fault-resilient software-defined persistent memory system of the present disclosure may be configured to allow a network administrator or other user to activate both SDPM and FRM in the computing device 200 at the same time (i.e., an "FRM-SDPM mode"), and thus the activation of the FRM and SDPM may be performed in response to a single instruction received by the BIOS engine 204. However, activation of SDPM in the computing device 200 following the activation of FRM in the computing device 200 (e.g., in response to separate instructions) will fall within the scope of the present disclosure as well.

With reference to FIGS. 6A, 6B, 6C and 6D, in an embodiment of block 404 and in response to receiving the instruction to activate SDPM in the computing device 200, the BIOS engine 204 may perform SDPM activation operations 604 that may include using the memory controller subsystem 304 in the volatile memory system 210/300 to define an SDPM zone in the memory address space 308 of the volatile memory system 210/300 that at least partially overlaps with the FRM primary data storage zone 506a. As described below, the SDPM zone may be defined in the memory address space 308 in a variety of manners that will fall within the scope of the present disclosure.

Figure 6B:
FIG. 6B is a schematic view illustrating an embodiment of the volatile memory system of FIG. 3 operating during the method of FIG. 4.

For example, FIG. 6B illustrates how the SDPM activation operations 604 by the BIOS engine 204 (using the memory controller subsystem 304) may configure a SDPM zone 606a with the same beginning address in the "beginning"/"bottom" memory address portion 308a of the operating-system-addressable memory address sub-range 0-(N-X) in the memory address space 308 as the FRM primary data storage zone 506a, and having the same size as the FRM primary data storage zone 506a. In one specific example in which the FRM and SDPM are activated using a single instruction (e.g., as part of the activation of the FRM-SDPM mode discussed above), a user may request an SDPM having a particular size (e.g., 32 GB) via that instruction and, in response, the BIOS engine 204 may define the FRM primary data storage zone 506a to match the SDPM zone 606a as illustrated in the FIG. 6B (i.e., the FRM primary data storage zone 506a and the SDPM zone 606a will begin at the same beginning address and each be 32 GB in size while the FRM mirrored data storage zone 506b will also be 32 GB in size).

However, while a specific example of the provisioning of an FRM primary data storage zone and SDPM zone having equal sizes and starting at the same beginning address has been described, one of skill in the art in possession of the present disclosure will appreciate that the FRM primary data storage zone/SDPM zone configuration illustrated in FIG. 6B may be provided based on a single instruction in a variety of other manners that will fall within the scope of the present disclosure. Furthermore, in a specific example in which FRM and SDPM are activated separately, a user may request that the SDPM have the same beginning address and same size as the FRM (or that the FRM have the same beginning address and same size as the SDPM) in a variety of manners that would be apparent to one of skill in the art in possession of the present disclosure.

Figure 6C:
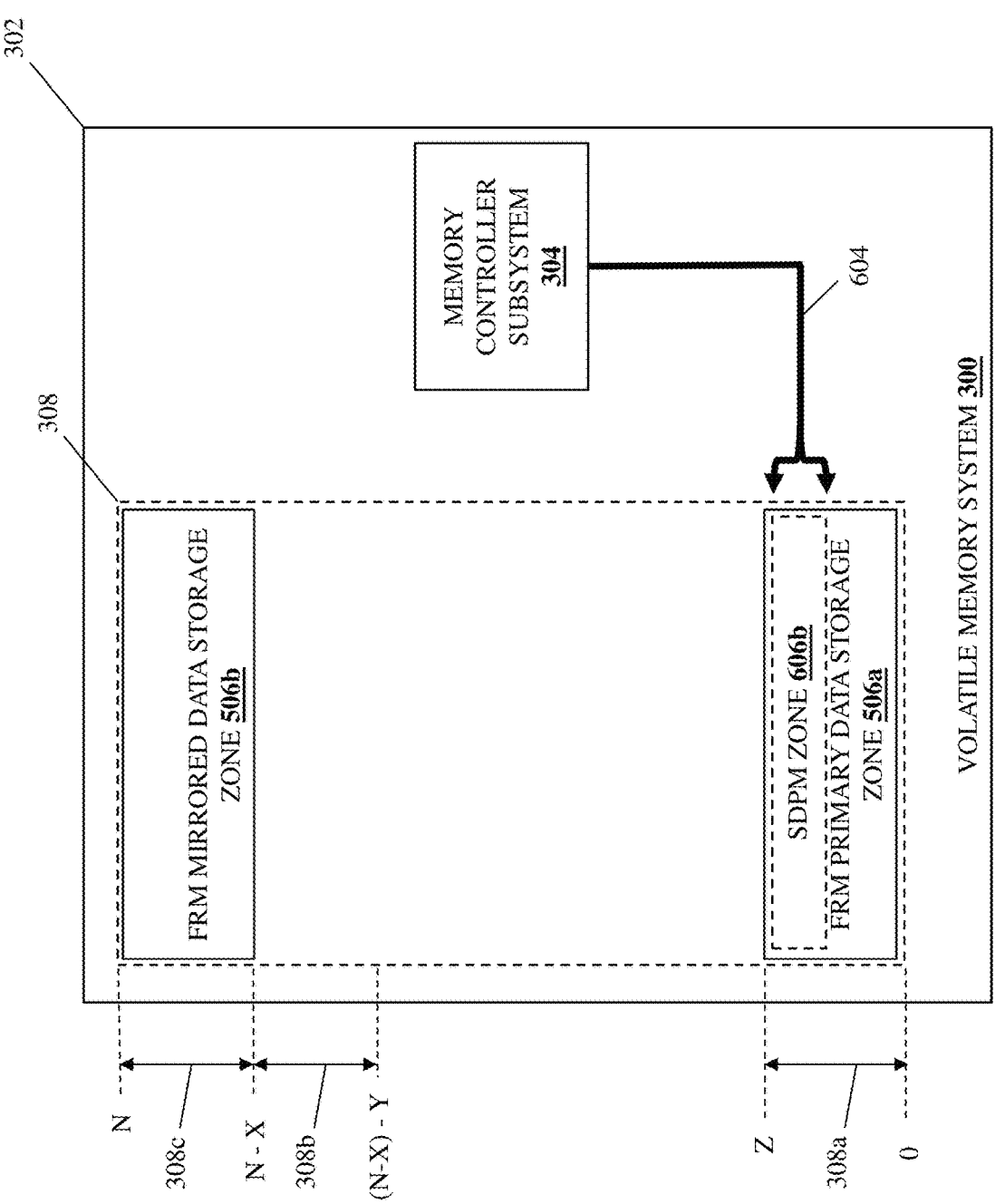
FIG. 6C is a schematic view illustrating an embodiment of the volatile memory system of FIG. 3 operating during the method of FIG. 4.

In another example, FIG. 6C illustrates how the SDPM activation operations 604 by the BIOS engine 204 (using the memory controller subsystem 304) may configure a SDPM zone 606b with a size that is less than the size of the FRM primary data storage zone 506a and that is contained within the FRM primary data storage zone 506a. In one specific example in which the FRM and SDPM are activated using a single instruction (e.g., as part of the activation of the FRM-SDPM mode discussed above), a user may be given the options to request an FRM that contains an SDPM (i.e., such that the SDPM will be entirely mirrored by the FRM as described in further detail below), and that also includes additional space for other data and, in response, the BIOS engine 204 may define the FRM primary data storage zone 506a with a size that is larger than the SDPM zone 606b but that contains the SDPM zone 606b.

However, while a specific example of the provisioning of a FRM primary data storage zone that is larger than and contains a SDPM zone has been described, one of skill in the art in possession of the present disclosure will appreciate the FRM primary data storage zone/SDPM zone configuration illustrated in FIG. 6C may be provided based on a single instruction in a variety of manners that will fall within the scope of the present disclosure. Furthermore, in a specific example in which FRM and SDPM are activated separately, a user may request that the SDPM be contained within and smaller than the FRM (or that the FRM contain and be larger than the SDPM) in a variety of manners that would be apparent to one of skill in the art in possession of the present disclosure.

Figure 6D:
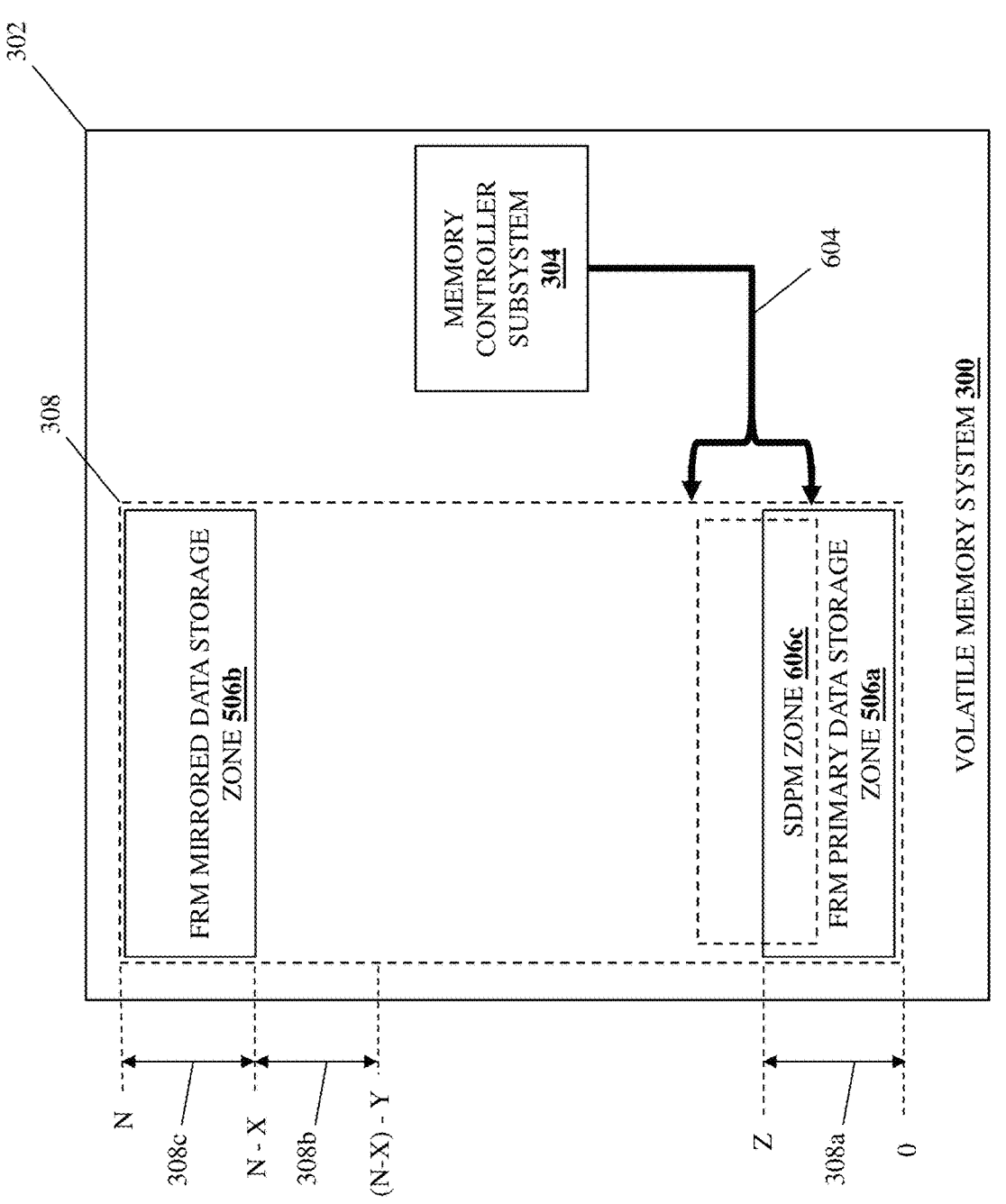
FIG. 6D is a schematic view illustrating an embodiment of the volatile memory system of FIG. 3 operating during the method of FIG. 4.

In yet another example, FIG. 6D illustrates how the SDPM activation operations 604 by the BIOS engine 204 (using the memory controller subsystem 304) may configure a SDPM zone 606c to a beginning address in the "beginning"/"bottom" memory address portion 308a of the operating-system-addressable memory address sub-range 0-(N-X) that is different than a beginning address of the FRM primary data storage zone 506a, and that includes a first portion located in the FRM primary data storage zone 506a, and a second portion located outside the FRM primary data storage zone 506a. In one specific example in which the FRM and SDPM are activated using a single instruction (e.g., as part of the activation of the FRM-SDPM mode discussed above), a user may be given the options to request an SDPM having a first portion that is included in the FRM (i.e., such that the first portion of the SDPM will be mirrored in the FRM as described in further detail below), and a second portion that is outside the FRM and, in response, the BIOS engine 204 may define the SDPM zone 606c with a first portion included in the FRM primary data storage zone 506a, and a second portion that is located outside the FRM primary data storage zone 506a.

However, while a specific example of the provisioning of a SDPM with a first portion that is included in an FRM and a second portion that is located outside the FRM, one of skill in the art in possession of the present disclosure will appreciate the FRM primary data storage zone/SDPM zone configuration illustrated in FIG. 6D may be provided based on a single instruction in a variety of manners that will fall within the scope of the present disclosure. Furthermore, in a specific example in which FRM and SDPM are activated separately, a user may request that the SDPM include portions located within and outside of the FRM in a variety of manners that would be apparent to one of skill in the art in possession of the present disclosure.

Figure 7:
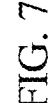
FIG. 7 is a schematic view illustrating an embodiment of the computing device of FIG. 2 operating during the method of FIG. 4.

The BIOS engine 204 in the computing device 200 may then report the overlapping SDPM zone and FRM primary data storage zone to one or more memory interfaces (e.g., Unified Extensible Firmware Interface (UEFI) memory attributes, an Advanced Configuration and Power Interface (ACPI) Non-Volatile Dual In-line Memory Module (NVDIMM) Firmware Interface Table (NFIT), as part of BIOS/operating system memory map reporting, and/or in other manners that would be apparent to one of skill in the art in possession of the present disclosure) as both SDPM "persistent" and FRM "resilient". In a specific example, with reference to FIG. 7 and following block 404, the SDPM zone 606a, 606b, or 606c configured at block 404 may be presented to the operating system engine 206 as a virtual NVDIMM 700 (as indicated by the dashed line in FIG. 7) and/or other persistent memory that would be apparent to one of skill in the art in possession of the present disclosure.

Figure 8:
FIG. 8 is a schematic view illustrating an embodiment of the computing device of FIG. 2 operating during the method of FIG. 4.
Figure 9:
FIG. 9 is a schematic view illustrating an embodiment of the volatile memory system of FIG. 3 operating during the method of FIG. 4.

The method 400 then proceeds to block 406 where the memory controller subsystem receives a request to write data to the SDPM zone that at least partially overlaps the FRM primary data storage zone. With reference to FIG. 8, in an embodiment of block 406, the operating system engine 206 included in the computing device 200 may perform SDPM data write request operations 800 that include generating a data write request and providing the data write request to the virtual NVDIMM 700 presented to it in the volatile memory system 210/300. As such, with reference to FIG. 9, and as part of the SDPM data write request operations, the memory controller subsystem 304 in the volatile memory system 210/300 may receive the data write request from the operating system engine 206. In a specific example, the data write request may include a request to write kernel code, in-flight data including metadata, and/or other data that would be apparent to one of skill in the art in possession of the present disclosure. However, while specific examples of different types of data provided for storage in the fault-resilient software-defined persistent memory system of the present disclosure have been discussed, one of skill in the art in possession of the present disclosure will appreciate how other types of data will fall within the scope of the present disclosure as well.

The method 400 then proceeds to block 408 where the memory controller subsystem writes data to the SDPM zone that at least partially overlaps with the FRM primary data storage zone. With continued reference to FIG. 9, in an embodiment of block 408 and in response to receiving the data write request, the memory controller subsystem 304 included in the volatile memory system 210/300 may perform SDPM data write operations 900 that include writing the data included in the data write request in the SDPM zone 606a defined as discussed above with reference to FIG. 6B. As discussed above with reference to FIG. 6B, the SDPM zone 606a may be defined to have the same size and beginning address as the FRM primary data storage zone 506a, and thus data written in the SDPM zone 606a as part of the SDPM data write operations 900 will also be written in the FRM primary data storage zone 506a.

While not illustrated, one of skill in the art in possession of the present disclosure will recognize how the SDPM data write operations at block 408 may be performed to write data to the SDPM zone 606b defined as discussed above with reference to FIG. 6C. As discussed above with reference to FIG. 6C, the SDPM zone 606b may be defined to have a smaller size and be contained within the FRM primary data storage zone 506a, and thus data written in the SDPM zone 606b as part of those SDPM data write operations will also be written in the FRM primary data storage zone 506a similarly as described above.

Similarly, while not illustrated, one of skill in the art in possession of the present disclosure will also recognize how the SDPM data write operations at block 408 may be performed to write data to the SDPM zone 606c defined as discussed above with reference to FIG. 6D. As discussed above with reference to FIG. 6D, the SDPM zone 606c may be defined to have a first portion that is included in, and a second portion that is located outside of, the FRM primary data storage zone 506a, and thus data written in the first portion of the SDPM zone 606c included in the FRM primary data storage zone 506a as part of those SDPM data write operations will also be written in the FRM primary data storage zone 506a similarly as described above.

The method 400 then proceeds to block 410 where the memory controller subsystem mirrors the data from the FRM primary data storage zone to the FRM mirrored data storage zone. With continued reference to FIG. 9, in an embodiment of block 410, the memory controller subsystem 304 included in the volatile memory system 210/300 may perform FRM data mirroring operations 902 that provide a copy of the data that is stored in the SDPM zone included in the FRM primary data storage zone 506a (i.e., the data storage in the SDPM zones 606a or 606b, or the data stored in the first portion of the SDPM zone 606c included in the FRM primary data storage zone 506a) in the FRM mirrored data storage zone 506b.

In one example, the FRM data mirroring operations 902 may be performed at the same time (or substantially the same time) as the SDPM data write operations 900, with the memory controller subsystem 304 writing the data included in the data write request to both the SDPM zone included in the FRM primary data storage zone 506a (i.e., the SDPM zones 606a or 606b, or the first portion of the SDPM zone 606c included in the FRM primary data storage zone 506a) and to the FRM mirrored data storage zone 506b. In other words, the memory controller subsystem 304 may write the data included in the data write request in parallel to 1) the SDPM zone 606a or 606b included in the FRM primary data storage zone 506a and 2) to the FRM mirrored data storage zone 506b, or the memory controller subsystem 304 may write the data included in the data write request in parallel to 1) the first portion of the SDPM zone 606c included in the FRM primary data storage zone 506a and 2) to the FRM mirrored data storage zone 506b.

In another example, the FRM data mirroring operations 902 may be performed subsequent to the SDPM data write operations 900, with the memory controller subsystem 304 copying the data in the FRM primary data storage zone 506a to the FRM mirrored data storage zone 506b. In yet another example, the FRM data mirroring operations 902 may be performed subsequent to the SDPM data write operations 900, with the memory controller subsystem 304 copying data in the FRM primary data storage zone 506a that has changed since the most recent FRM data mirroring operations (e.g., the data written as part of the SDPM data write operations 900) to the FRM mirrored data storage zone 506b. However, while a few specific examples have been provided, one of skill in the art in possession of the present disclosure will appreciate that the data stored in the SDPM zone that overlaps with the FRM primary data storage zone may be copied to the FRM mirrored data storage zone using a variety of techniques that will fall within the scope of the present disclosure.

Figure 10A:
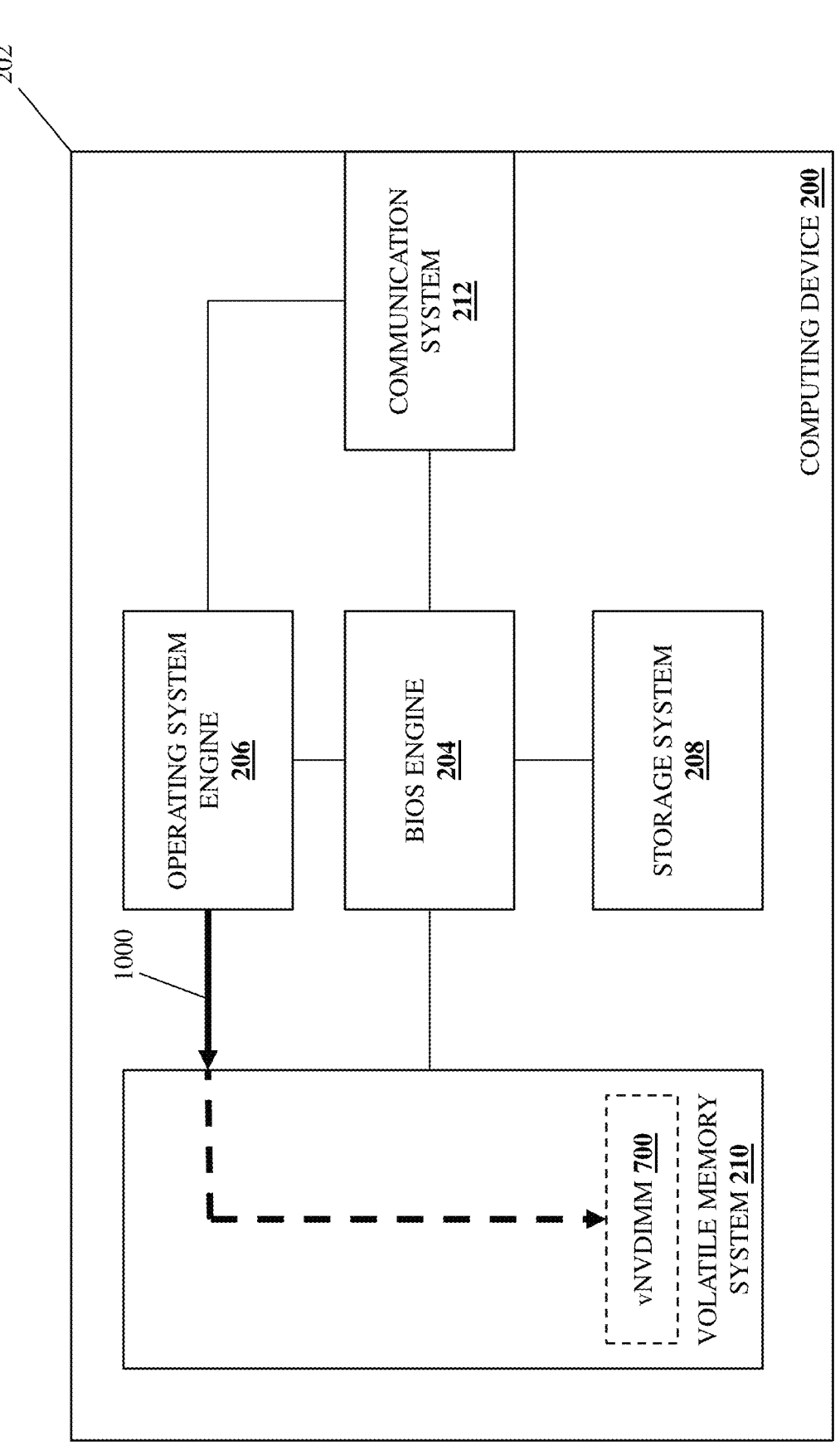
FIG. 10A is a schematic view illustrating an embodiment of the computing device of FIG. 2 operating during the method of FIG. 4.
Figure 10B:
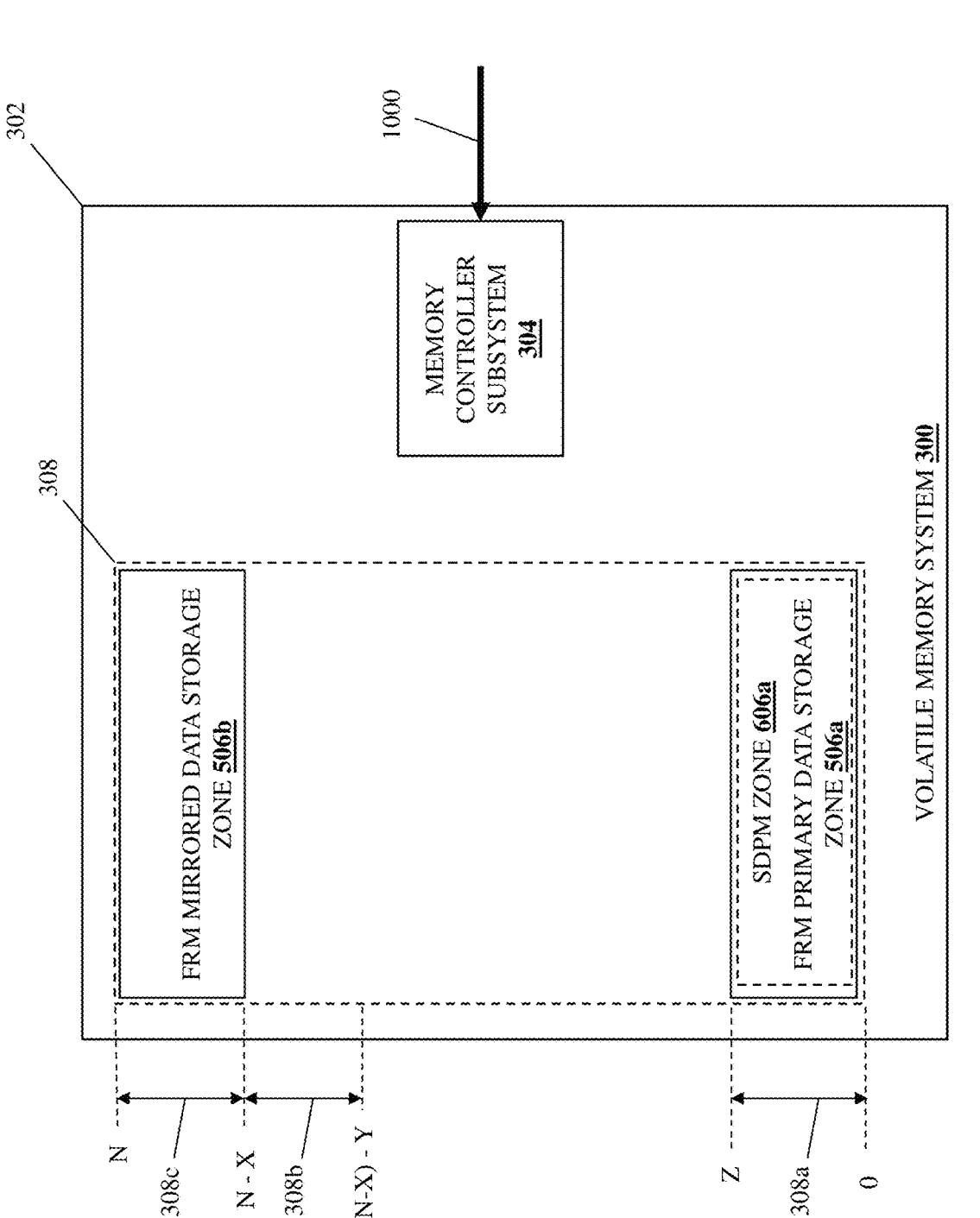
FIG. 10B is a schematic view illustrating an embodiment of the volatile memory system of FIG. 3 operating during the method of FIG. 4.

The method 400 then proceeds to block 412 where the memory controller subsystem receives a read request for data in the SDPM zone that at least partially overlaps with the FRM primary data storage zone. With reference to FIG. 10A, in an embodiment of block 412, the operating system engine 206 included in the computing device 200 may perform SDPM data read request operations 1000 that include generating a data read request and providing the data read request to the virtual NVDIMM 700 presented to it in the volatile memory system 210/300. As such, with reference to FIG. 10B and as part of the SDPM data read request operations 1000, the memory controller subsystem 304 in the volatile memory system 210/300 may receive the data read request from the operating system engine 206. In a specific example, the data read request may include a request to read kernel code, in-flight data including metadata, and/or other data that would be apparent to one of skill in the art in possession of the present disclosure. However, while different types of data read from the fault-resilient software-defined persistent memory system of the present disclosure have been discussed, one of skill in the art in possession of the present disclosure will appreciate how other types of data will fall within the scope of the present disclosure as well.

The method 400 then proceeds to decision block 414 where it is determined whether an uncorrectable error is associated with data in the SDPM zone that at least partially overlaps with the FRM primary data storage zone. In an embodiment, at decision block 414 and in response to receiving the data read request, the memory controller subsystem 304 included in the volatile memory system 210/300 may determine, as part of its attempt to read that data identified in the data read request, whether there is an uncorrectable error associated with that data that is stored in the SDPM zone included in the FRM primary data storage zone 506a. For example, in the event there is an uncorrectable error associated with the data being read that exceeds the error correction capabilities of Error Correcting Code (ECC), that uncorrectable error may be identified by the memory controller subsystem 304. However, while specific examples of the identification of uncorrectable errors have been discussed, one of skill in the art in possession of the present disclosure will appreciate how uncorrectable errors may be identified using a variety of techniques that will fall within the scope of the present disclosure as well.

Figure 10C:
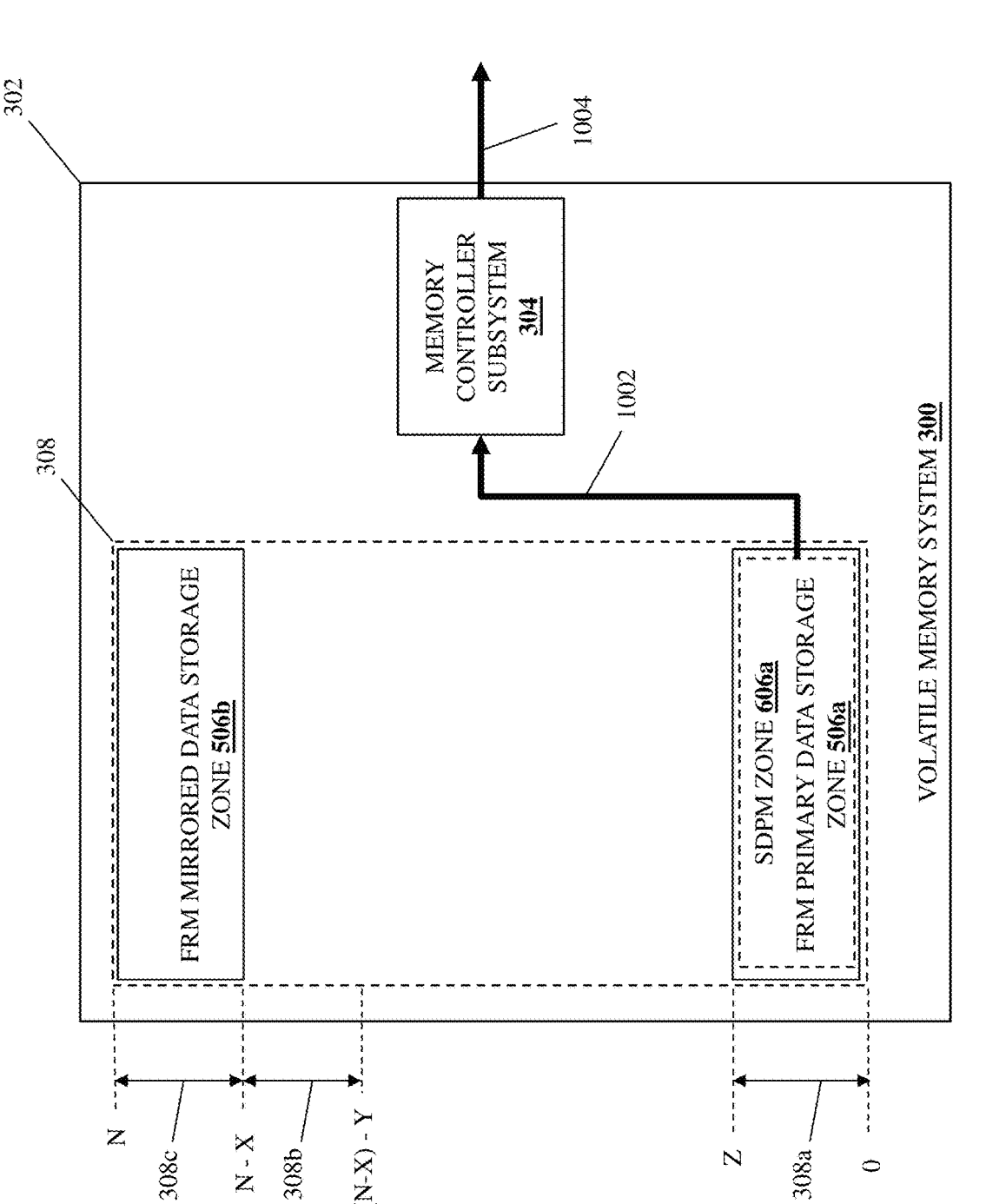
FIG. 10C is a schematic view illustrating an embodiment of the volatile memory system of FIG. 3 operating during the method of FIG. 4.

If, at decision block 414, it is determined that an uncorrectable error is not associated with data in the SDPM zone that at least partially overlaps with the FRM primary data storage zone, the method 400 proceeds to block 416 where the memory controller subsystem provides data from the SDPM zone that at least partially overlaps with the FRM primary data storage zone in response to the read request. With reference to FIG. 10C, in an embodiment of decision block 414 and in response to receiving the data read request at block 412, the memory controller subsystem 304 included in the volatile memory system 210/300 may perform SDPM data read operations 1002 that include attempting to read the data that is identified in the data read request and that is stored in the SDPM zone included in the FRM primary data storage zone 506a (e.g., any of the SDPM zone 606a, the SDPM zone 606b, or the first portion of the SDPM zone 606c).

Figure 10D:
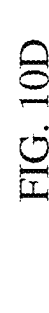
FIG. 10D is a schematic view illustrating an embodiment of the computing device of FIG. 2 operating during the method of FIG. 4.

With reference to FIGS. 10C and 10D, as discussed above, during the SDPM data read operations 1002 the memory controller subsystem 304 may determine that no uncorrectable errors are associated with the data being read and, in response, the memory controller subsystem 304 may perform data provisioning operations 1004 that include providing that data to the operating system engine 206. To provide a specific example, at block 416 the memory controller subsystem 304 may retrieve kernel code, in-flight data including metadata, and/or other data that was stored in the SDPM zone 606a at block 408, and provide that data to the operating system engine 206. However, while specific examples of types of data provided in response to a read request have been described, one of skill in the art in possession of the present disclosure will appreciate how other types of data may be provided in response to a read request while remaining within the scope of the present disclosure as well.

Figure 11A:
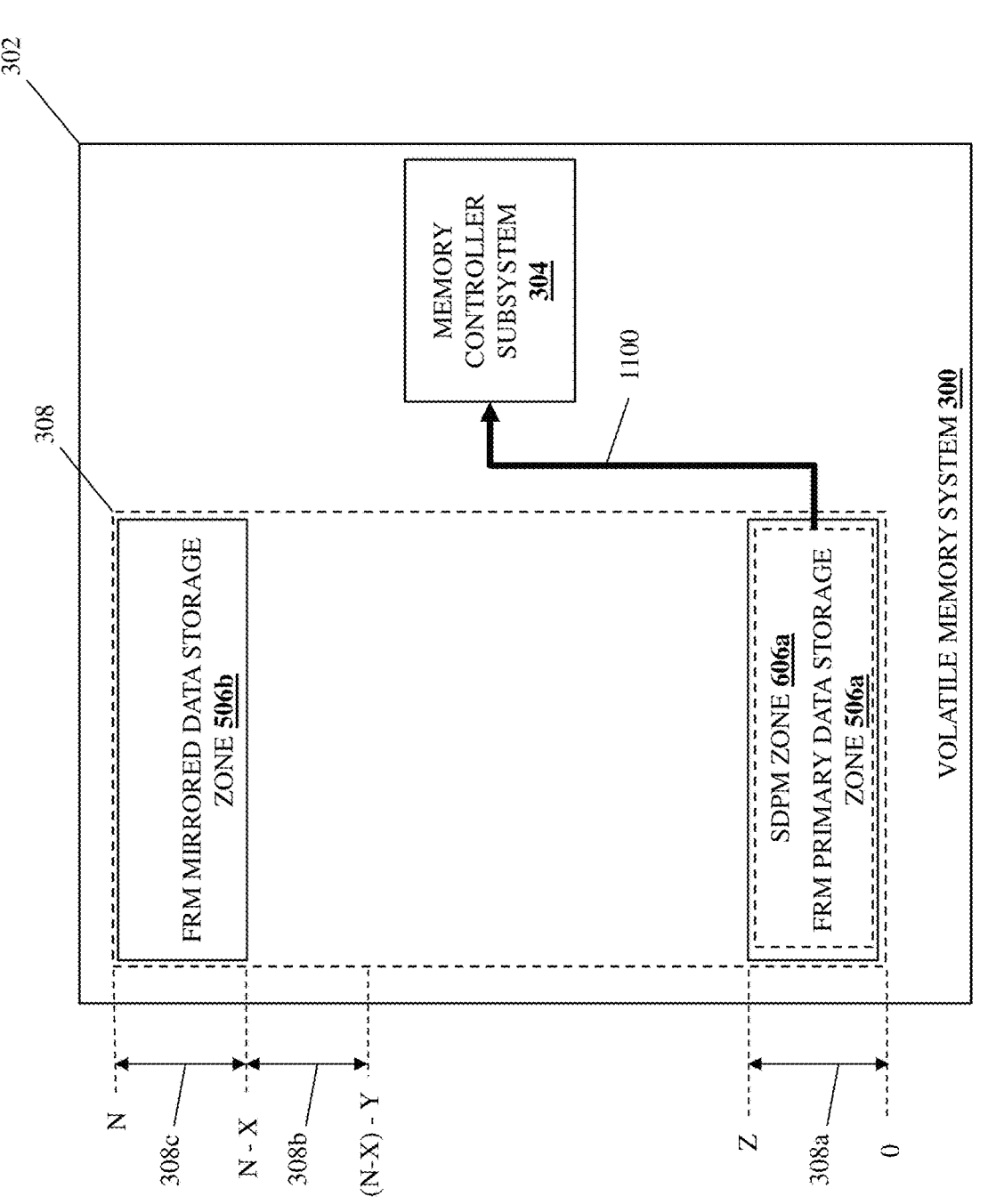
FIG. 11A is a schematic view illustrating an embodiment of the volatile memory system of FIG. 3 operating during the method of FIG. 4.

If, at decision block 414, it is determined that an uncorrectable error is associated with data in the SDPM zone that at least partially overlaps with the FRM primary data storage zone, the method 400 proceeds to block 418 where the memory controller subsystem provides data from the FRM mirrored data storage zone in response to the read request. With reference to FIG. 11A, in an embodiment of block 418 and in response to receiving the SDPM data read request, the memory controller subsystem 304 included in the volatile memory system 210/300 may perform SDPM data read operations 1100 that include attempting to read the data that is identified in the data read request from the SDPM zone included in the FRM primary data storage zone 506a (e.g., any of the SDPM zone 606a, the SDPM zone 606b, or the first portion of the SDPM zone 606c), and determining that an uncorrectable error is associated with that data. For example, during the SDPM data read operations 1100, the memory controller subsystem 304 may determine that an uncorrectable is associated with the data being read that exceeds the error correction capabilities of Error Correcting Code (ECC). However, while a specific example of the identification of uncorrectable errors have been discussed, one of skill in the art in possession of the present disclosure will appreciate how uncorrectable error may be identified using a variety of techniques that will fall within the scope of the present disclosure as well.

Figure 11B:
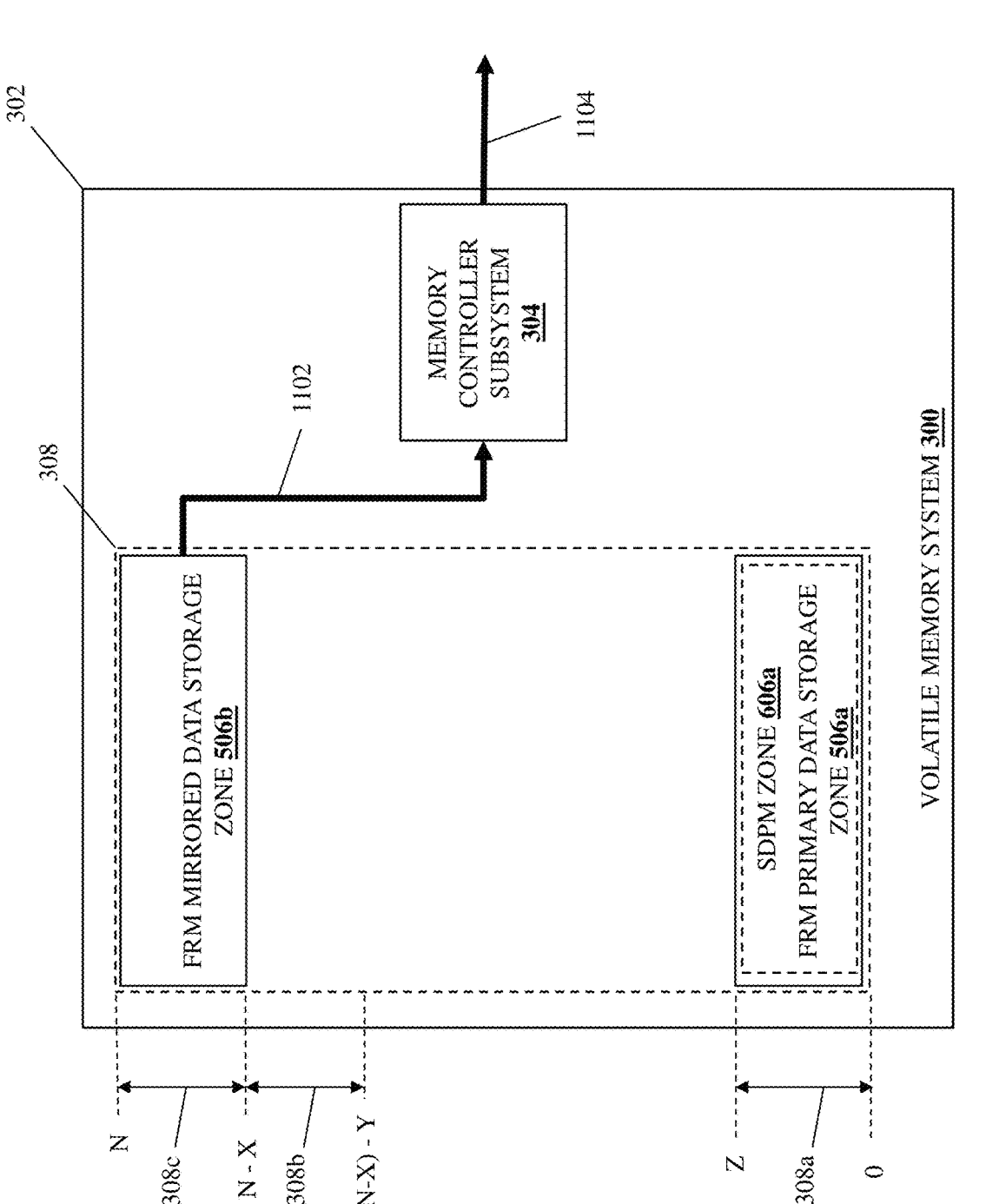
FIG. 11B is a schematic view illustrating an embodiment of the volatile memory system of FIG. 3 operating during the method of FIG. 4.
Figure 11C:
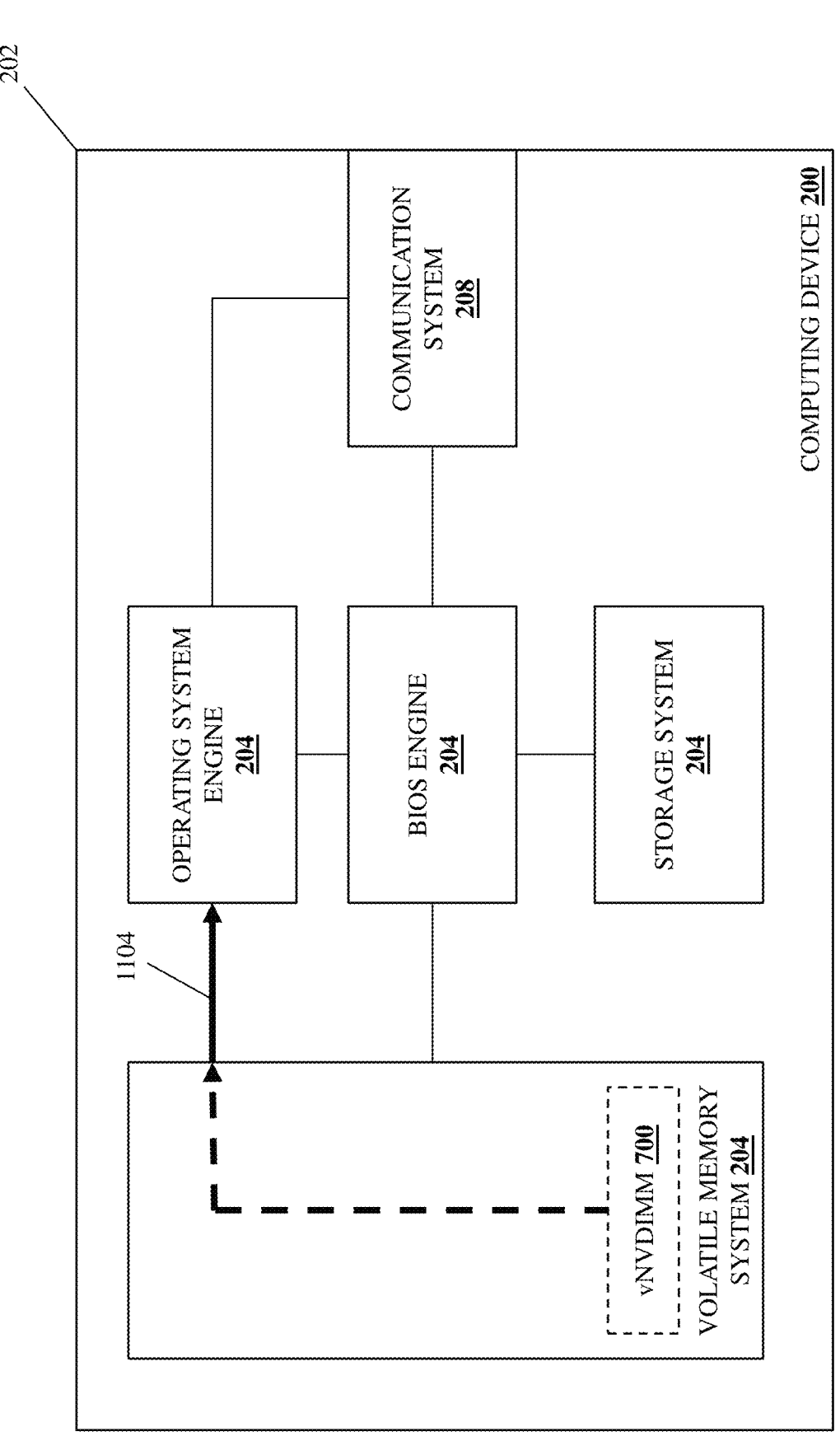
FIG. 11C is a schematic view illustrating an embodiment of the computing device of FIG. 2 operating during the method of FIG. 4.

With reference to FIGS. 11B and 11C, as discussed above, in response to determining that an uncorrectable error is associated with the data being read from the SDPM zone included in the FRM primary data storage zone 506a, the memory controller subsystem 304 may perform FRM mirrored data storage zone read operations 1102 that includes reading the data that is identified in the data read request from the FRM mirrored data storage zone 506b, which as described above was written to both the SDPM zone included in the FRM primary data storage zone 506a at block 408, and to the FRM mirrored data storage zone 506b at block 410. With reference to FIGS. 11B and 11C, the memory controller subsystem 304 may then perform data provisioning operations 1104 that include providing that data to the operating system engine 204. As such, the issues with conventional SDPM memory systems in the event an uncorrectable error occurs with data stored in an SDPM memory region (which can result in the crash of an application for which that data was written along with loss of that data) are eliminated, as a backup copy of that data may be retrieved from the FRM mirrored data storage zone 506b and provided to the operating system engine 204 in a manner that is transparent to the operating system/operating system engine 204 (i.e., the operating system is unaware of the uncorrectable error).

Figure 11D:
FIG. 11D is a schematic view illustrating an embodiment of the volatile memory system of FIG. 3 operating during the method of FIG. 4.

With reference to FIG. 11D, in some embodiments and following the performance of the data provisioning operations 1104 at block 418, the memory controller subsystem 304 included in the volatile memory system 300 may perform SDPM data restoration operations 1106 that include retrieving the "error-free" copy of the data from the FRM mirrored data storage zone 506b (which is a copy of the data associated with the uncorrectable error in the FRM primary data storage zone 506a (the "error" copy)), and overwriting the "error" copy of the data stored in the SDPM zone 606a with that "error free" copy of the data, and one of skill in the art in possession of the present disclosure will appreciate how similar SDPM data restoration operations may be performed for the SDPM zone 606b and the first portion of the SDPM zone 606c discussed above. As will be appreciated by one of skill in the art in possession of the present disclosure, the SDPM data restoration operations 1106 may be performed to restore the data in the SDPM zone that experienced an uncorrectable error, or may identify an operating issue associated with the memory device in which that data is stored (i.e., if the uncorrectable error with that data persists following the overwriting of the "error" copy of the data stored in the SDPM zone 606a with the "error-free" copy of the data from the FRM mirrored data storage zone 506b). While not illustrated or described in detail, one of skill in the art in possession of the present disclosure will appreciate how a user may be informed of such an operating issue associated with the memory device so that they may replace that memory device.

Figure 12:
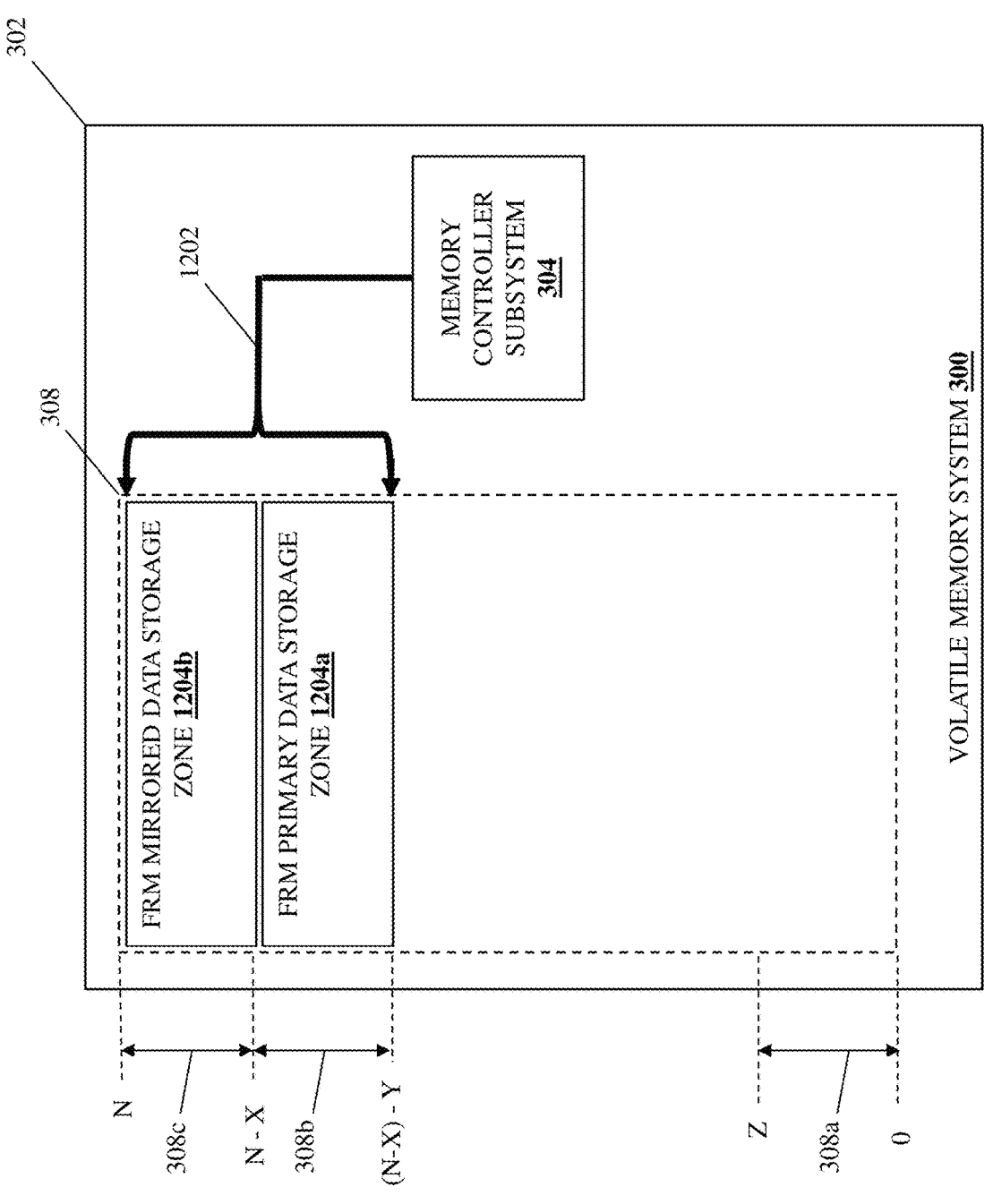
FIG. 12 is a schematic view illustrating an embodiment of the volatile memory system of FIG. 3 operating during the method of FIG. 4.

As discussed above with reference to FIG. 5B in which the FRM primary data storage zone 506a is defined in the "beginning"/"bottom" memory address portion 308a of the operating-system-addressable memory address sub-range 0-(N-X) in the memory address space 308, the FRM primary data storage zone used in the present disclosure may be defined in other portions of the operating-system-addressable memory address sub-range 0-(N-X) in the memory address space 308 while remaining within the scope of the present disclosure as well. In another specific example, with reference to FIG. 12, at block 404 and as part of FRM activation operations 1202 (which are substantially similar to FRM activation operations 504 discussed above), the memory controller subsystem 304 in the volatile memory system 210/300 may define a FRM primary data storage zone 1204a in the "ending"/"top" memory address portion 308b of the operating-system-addressable memory address sub-range 0-(N-X) in the memory address space 308 (i.e., the portion (N-X)-Y)-(N-X) in the total memory address range 0-N), and may define a FRM mirrored data storage zone 1204b in the "mirroring" memory address portion 308c provided by the non-operating-system-addressable memory address sub-range (N-X)-N in the total memory address range 0-N). As such, one of skill in the art in possession of the present disclosure will appreciate that the FRM primary data storage zone and the FRM mirrored data storage zone used in the present disclosure may be defined in any portions of the memory address space 308 while remaining within the scope of the present disclosure as well.

Continuing with this specific example, following (or along with) the performance of FRM activation operations 1202 and similarly as described above, the BIOS engine 204 and the memory controller subsystem 304 may operate to perform SDPM activation operations 1302 that define an SDPM zone in the memory address space 308 that at least partially overlaps with the FRM primary data storage zone 1204a.

Similarly as described above with reference to FIG. 6B, FIG. 13A illustrates how the SDPM activation operations 1302 may configure a SDPM zone 1304a with the same beginning address in the "end"/"top" memory address portion 308b of the operating-system-addressable memory address sub-range 0-(N-X) in the memory address space 308 as the FRM primary data storage zone 1204a, and having the same size as the FRM primary data storage zone 1204a, and one of skill in the art in possession of the present disclosure will appreciate how the FRM and SDPM illustrated in FIG. 13A may be provided in response to a single instruction, activated separately, and/or otherwise provided similarly as described above.

Similarly as described above with reference to FIG. 6C, FIG. 13B illustrates how the SDPM activation operations 1302 may configure a SDPM zone 1304b with a size that is less than the size of the FRM primary data storage zone 1204a and that is contained within the FRM primary data storage zone 1204a, and one of skill in the art in possession of the present disclosure will appreciate how the FRM and SDPM illustrated in FIG. 13B may be provided in response to a single instruction, activated separately, and/or otherwise provided similarly as described above.

Similarly as described above with reference to FIG. 6D, FIG. 13C illustrates how the SDPM activation operations 1302 may configure a SDPM zone 1304c with a beginning address that is outside the "ending"/"top" memory address portion 308b of the operating-system-addressable memory address sub-range 0-(N-X) and that is different than the beginning address of the FRM primary data storage zone 1204a, and that includes a first portion that is located outside the FRM primary data storage zone 1204a and a second portion that is included in the FRM primary data storage zone 1204a, and one of skill in the art in possession of the present disclosure will appreciate how the FRM SDPM (as illustrated in FIG. 13C) may be provided in response to a single instruction, activated separately, and/or otherwise provided similarly as described above.

Figure 13A:
FIG. 13A is a schematic view illustrating an embodiment of the volatile memory system of FIG. 3 operating during the method of FIG. 4.
Figure 13B:
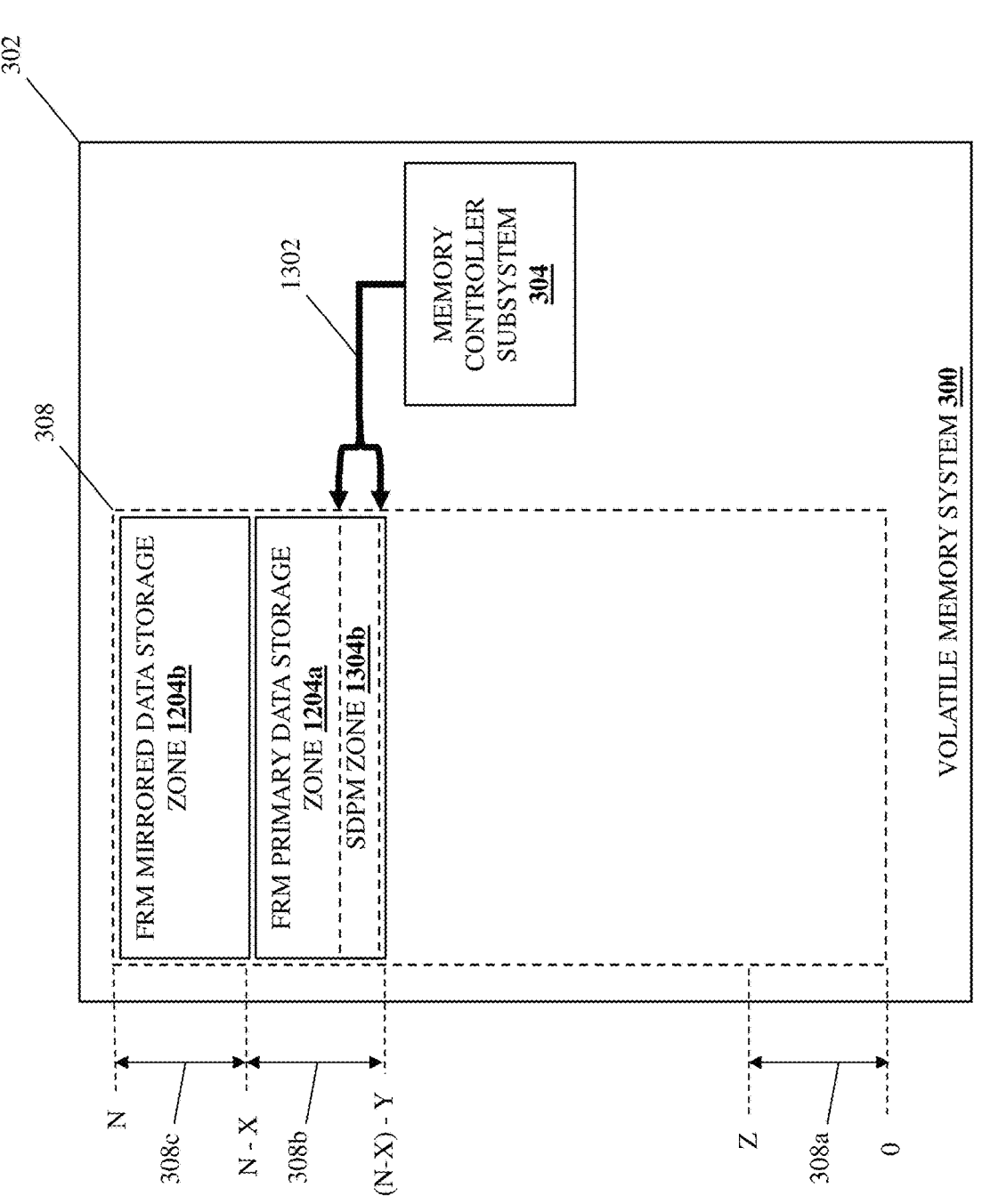
FIG. 13B is a schematic view illustrating an embodiment of the volatile memory system of FIG. 3 operating during the method of FIG. 4.
Figure 13C:
FIG. 13C is a schematic view illustrating an embodiment of the volatile memory system of FIG. 3 operating during the method of FIG. 4.

As will be appreciated by one of skill in the art in possession of the present disclosure, the embodiments illustrated in FIGS. 13A-13C require modification to conventional Memory Reference Code (MRC) in the BIOS, as well as to chipset registers, System Address Decoder (SAD) alignment, and/or other processing system features, and thus their implementation may require cooperation from processing system manufacturers.

Figure 14A:
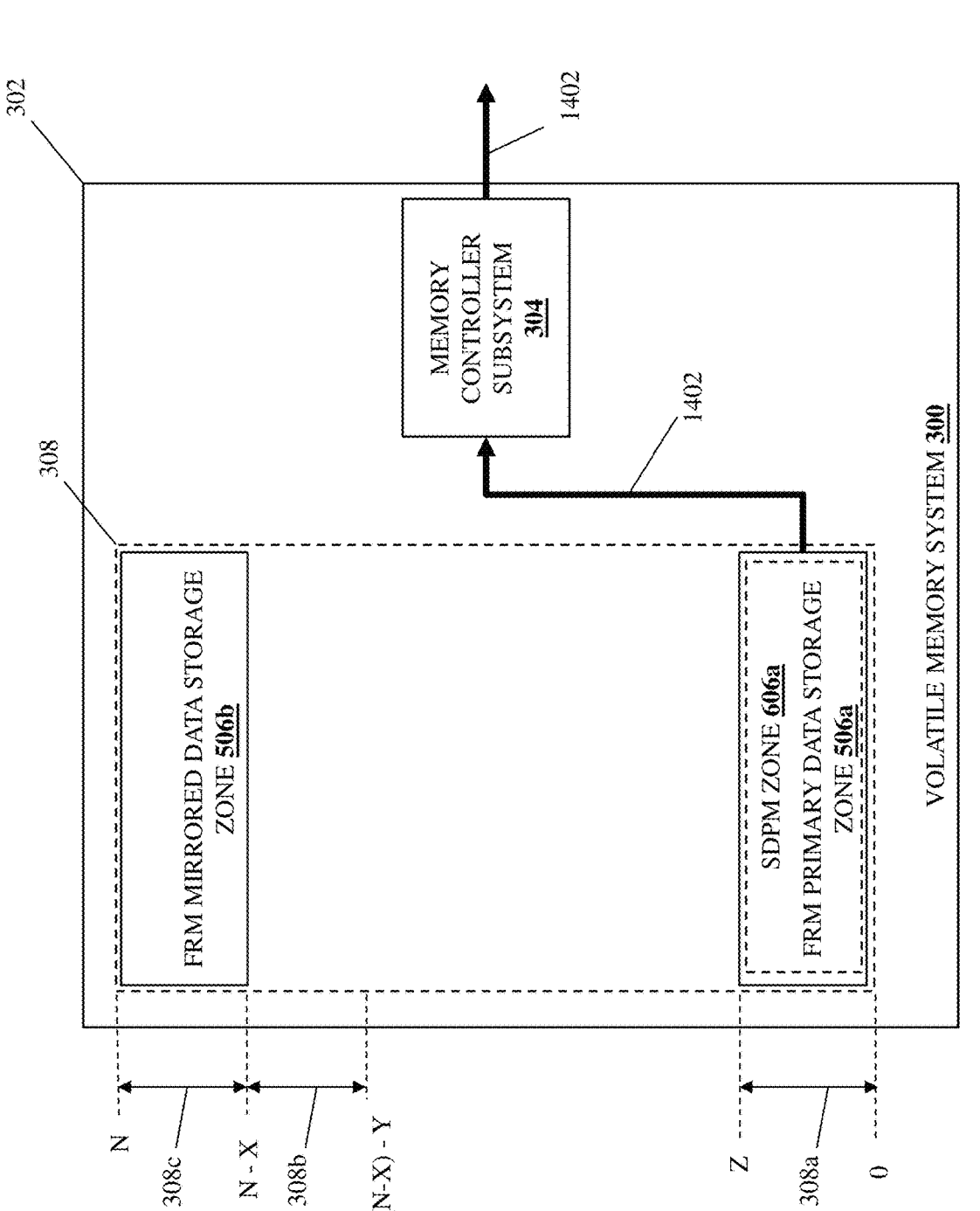
FIG. 14A is a schematic view illustrating an embodiment of the volatile memory system of FIG. 3 operating during the method of FIG. 4.
Figure 14B:
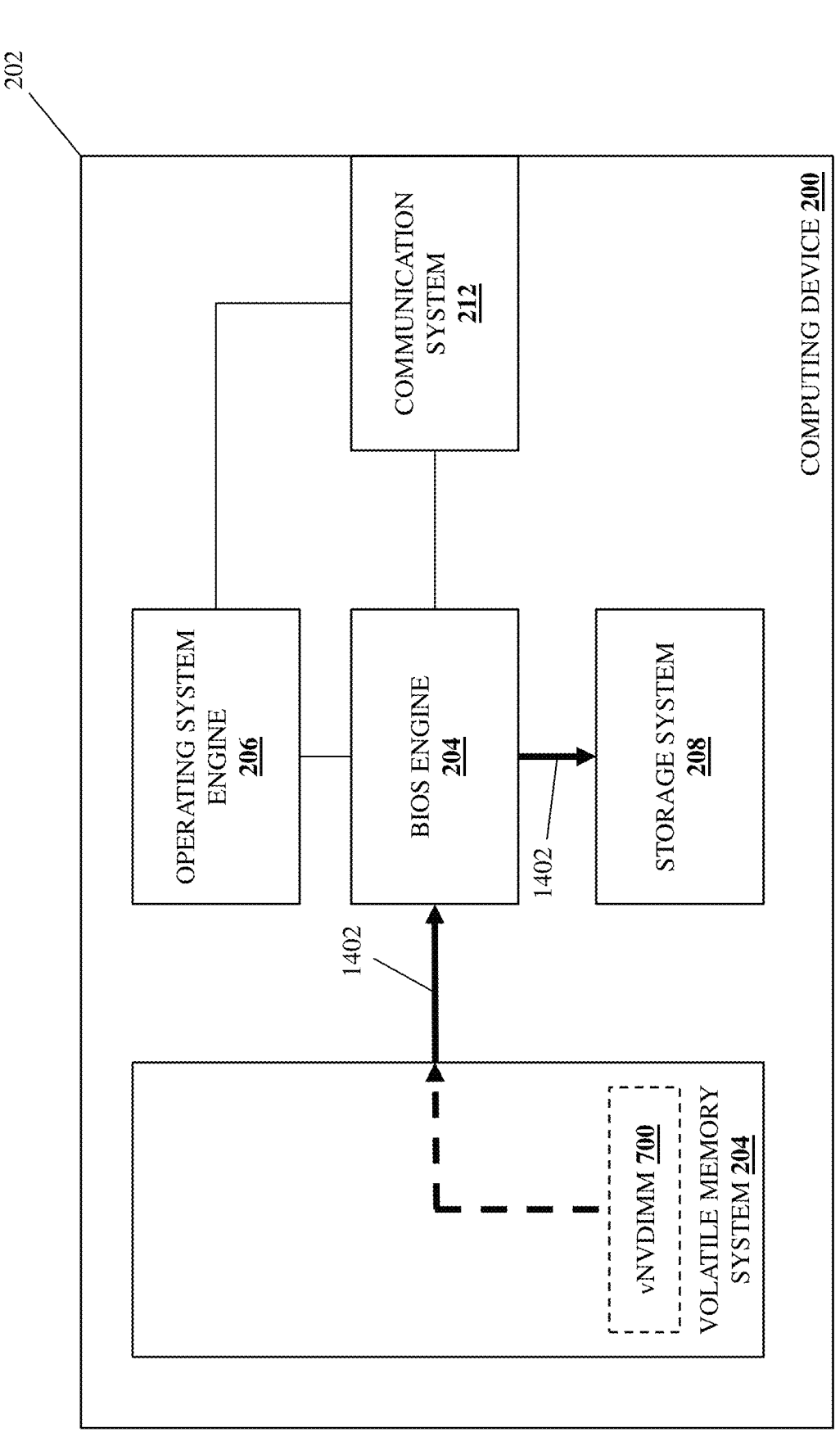
FIG. 14B is a schematic view illustrating an embodiment of the computing device of FIG. 2 operating during the method of FIG. 4.

While not described in detail, one of skill in the art in possession of the present disclosure will appreciate the SDPM of the present disclosure may perform SDPM operations during a power loss, system reset, shutdown event, and/or other volatile memory system unavailable-power scenario known in the art. For example, with reference to FIGS. 14A and 14B, in response to such a volatile memory system unavailable-power scenario and while the volatile memory system 300 is powered by a battery or other backup power source, the BIOS engine 204 may perform SDPM operations 1402 via the memory controller subsystem 304 to copy data stored in the SDPM zone 606a to the storage system 208, and one of skill in the art in possession of the present disclosure will appreciate how that data may be copied from the storage system 208 back to the SDPM zone 606a following a subsequent initialization of the computing device 200. While not illustrated or described in detail, one of skill in the art in possession of the present disclosure will appreciate how similar SDPM operations may be performed with data stored in the SDPM zone 606b or the SDPM zone 606c discussed above.

Thus, systems and methods have been described that configure a volatile memory system with Fault Resilient Mode (FRM) primary and mirrored data storage zones, and then configure that volatile memory system with a Software-Defined Persistent Memory (SDPM) zone that at least partially overlaps the FRM primary data storage zone. For example, the fault-resilient software-defined persistent memory system of the present disclosure may include a chassis, a volatile memory system that is housed in the chassis, and a Basic Input/Output System (BIOS) that is housed in the chassis and coupled to the volatile memory system. The BIOS defines a FRM primary data storage zone and a FRM mirrored data storage zone in the volatile memory system. The BIOS also defines a SDPM zone in the volatile memory system that at least partially overlaps with the FRM primary data storage zone. A memory controller subsystem in the volatile memory system receives a write request to write data to the SDPM zone and, in response to receiving the write request, writes the data to the SDPM zone. The memory controller subsystem then writes the data to the FRM mirrored data storage zone. As such, if uncorrectable errors occur in the data stored in the SDPM zone that at least partially overlaps with the FRM primary data storage zone, the copy of that data in the FRM mirrored data storage zone may be used.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A fault-resilient software-defined persistent memory system, comprising:
   a chassis;
   a volatile memory system that is housed in the chassis;
   a Basic Input/Output System (BIOS) that is housed in the chassis, that is coupled to the volatile memory system, and configured to:
      define a Fault Resilient Mode (FRM) primary data storage zone and a FRM mirrored data storage zone in the volatile memory system; and
      define a Software-Defined Persistent Memory (SDPM) zone in the volatile memory system that at least partially overlaps with the FRM primary data storage zone; and
   a memory controller subsystem that is included in the volatile memory system and that is configured to:
      receive a write request to write data to the SDPM zone that at least partially overlaps with the FRM primary data storage zone;
      write, in response to the write request, the data to the SDPM zone that at least partially overlaps with the FRM primary data storage zone; and
      write, to the FRM mirrored data storage zone, the data that was written to the SDPM zone that at least partially overlaps with the FRM primary data storage zone.

2. The system of claim 1, wherein the BIOS is configured to:
   define the SDPM zone such that all of the SDPM zone is included in the FRM primary data storage zone.

3. The system of claim 1, wherein the BIOS is configured to:
   define the SDPM zone and the FRM primary data storage zone such that the SDPM zone and the FRM primary data storage zone include the same beginning address and the same size.

4. The system of claim 1, wherein the memory controller subsystem is configured to:
   receive a read request for the data in the SDPM zone that at least partially overlaps with the FRM primary data storage zone;
   determine that an uncorrectable error is associated with the data in the SDPM zone that at least partially overlaps with the FRM primary data storage zone; and
   provide, in response to determining that the uncorrectable error is associated with the data in the SDPM zone that at least partially overlaps with the FRM primary data storage zone, the data from the FRM mirrored data storage zone in response to the read request.

5. The system of claim 1, wherein the BIOS is configured to:
   define the FRM primary data storage zone in a beginning portion of a memory address range provided by the volatile memory system.

6. The system of claim 1, wherein the BIOS is configured to:
   define the FRM primary data storage zone in an end portion of a memory address range provided by the volatile memory system.

7. The system of claim 1, wherein the BIOS is configured to:
   provide, in response to a loss of primary power to the volatile memory system, the data stored in the SDPM zone to a non-volatile storage system.

8. A volatile memory system, including:
   at least one memory device that defines a memory address range; and
   a memory controller subsystem that is coupled to the at least one memory device and that is configured to:
      receive a write request to write data to a Software-Defined Persistent Memory (SDPM) zone that is defined in the memory address range such that the SDPM zone at least partially overlaps with a Fault Resilient Memory (FRM) primary data storage zone that is defined in the memory address range;
      write, in response to the write request, the data to the SDPM zone that at least partially overlaps with the FRM primary data storage zone; and
      write, to an FRM mirrored data storage zone that is defined in the memory address range, the data that was written to the SDPM zone that at least partially overlaps with the FRM primary data storage zone.

9. The volatile memory system of claim 8, wherein the SDPM zone is defined in the memory address range such that all of the SDPM zone is included in the FRM primary data storage zone.

10. The volatile memory system of claim 8, wherein the SDPM zone and the FRM primary data storage zone are defined in the memory address range such that the SDPM zone and the FRM primary data storage zone include the same beginning address and the same size.

11. The volatile memory system of claim 8, wherein the memory controller subsystem is configured to:
   receive a read request for the data in the SDPM zone that at least partially overlaps with the FRM primary data storage zone;
   determine that an uncorrectable error is associated with the data in the SDPM zone that at least partially overlaps with the FRM primary data storage zone; and provide, in response to determining that the uncorrectable error is associated with the data in the SDPM zone that at least partially overlaps with the FRM primary data storage zone, the data from the FRM mirrored data storage zone in response to the read request.

12. The volatile memory system of claim 8, wherein the FRM primary data storage zone is defined in a beginning portion of the memory address range.

13. The volatile memory system of claim 8, wherein the FRM primary data storage zone is defined in an end portion of the memory address range.

14. A method for providing a fault-resilient software-defined persistent memory system in a computing device, comprising:

receiving, by a memory controller subsystem a write request to write data to a Software-Defined Persistent Memory (SDPM) zone that is defined in a memory address range provided by at least one memory device in a volatile memory system such that the SDPM zone at least partially overlaps with a Fault Resilient Memory (FRM) primary data storage zone that is defined in the memory address range;

writing, by the memory controller subsystem, in response to the write request, the data to the SDPM zone that at least partially overlaps with the FRM primary data storage zone; and writing, by the memory controller subsystem to a FRM mirrored data storage zone that is defined in the memory address range, the data that was written to the SDPM zone that at least partially overlaps with the FRM primary data storage zone.

15. The method of claim 14, wherein the SDPM zone is defined in the memory address range such that all of the SDPM zone is included in the FRM primary data storage zone in the memory address range.

16. The method of claim 14, wherein the SDPM zone and the FRM primary data storage zone are defined in the memory address range such that the SDPM zone and the FRM primary data storage zone include the same beginning address and the same size.

17. The method of claim 14, further comprising:

receiving, by the memory controller subsystem, a read request for the data in the SDPM zone that at least partially overlaps with the FRM primary data storage zone;

determining, by the memory controller subsystem, that an uncorrectable error is associated with the data in the SDPM zone that at least partially overlaps with the FRM primary data storage zone; and providing, by the memory controller subsystem, in response to determining that the uncorrectable error is associated with the data in the SDPM zone that at least partially overlaps with the FRM primary data storage zone, the data from the FRM mirrored data storage zone in response to the read request.

18. The method of claim 14, wherein the FRM primary data storage zone is defined in a beginning portion of the memory address range.

19. The method of claim 14, wherein the FRM primary data storage zone is defined in an end portion of the memory address range.

20. The method of claim 14, further comprising:

providing, by a Basic Input/Output System (BIOS), in response to a loss of primary power to the volatile memory system, the data stored in the SDPM zone to a non-volatile storage system.

\* \* \* \* \*